US011477660B2

(12) United States Patent
Furuichi

(10) Patent No.: US 11,477,660 B2
(45) Date of Patent: Oct. 18, 2022

(54) WIRELESS DEVICE, TERMINAL, METHOD, AND COMPUTER PROGRAM

(71) Applicant: Sony Corporation, Tokyo (JP)

(72) Inventor: Sho Furuichi, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 17/049,965

(22) PCT Filed: May 27, 2019

(86) PCT No.: PCT/JP2019/020967
§ 371 (c)(1),
(2) Date: Oct. 23, 2020

(87) PCT Pub. No.: WO2019/230671
PCT Pub. Date: Dec. 5, 2019

(65) Prior Publication Data
US 2021/0235276 A1 Jul. 29, 2021

(30) Foreign Application Priority Data

Jun. 1, 2018 (JP) .............................. JP2018-105899

(51) Int. Cl.
H04W 16/14 (2009.01)
H04W 16/02 (2009.01)
(Continued)

(52) U.S. Cl.
CPC ........... H04W 16/14 (2013.01); H04W 16/02 (2013.01); H04W 52/243 (2013.01); H04W 72/0453 (2013.01)

(58) Field of Classification Search
CPC ... H04W 16/14; H04W 16/02; H04W 52/243; H04W 72/0453; H04W 24/02
See application file for complete search history.

(56) References Cited

U.S. PATENT DOCUMENTS

2009/0323619 A1* 12/2009 Tajer ..................... H04W 72/08
370/329
2013/0016221 A1* 1/2013 Charbit ................. H04W 16/14
348/180
(Continued)

FOREIGN PATENT DOCUMENTS

JP 2011-50033 A 3/2011
WO 2011/158502 A1 12/2011
(Continued)

OTHER PUBLICATIONS

International Search Report and Written Opinion dated Aug. 6, 2019 for PCT/JP2019/020967 filed on May 27, 2019, 8 pages including English Translation of the International Search Report.
(Continued)

Primary Examiner — Marcus Hammonds
(74) Attorney, Agent, or Firm — Xsensus LLP

(57) ABSTRACT

There is provided a wireless device including an acquisition unit (110) that acquires a distribution amount of an interference margin to a second wireless system that shares a part or a whole of a frequency allocated to a first wireless system, from a device that manages one or more of the second wireless systems, and a control unit (120) that determines, from the interference margin, a distribution amount of the interference margin to a terminal that performs wireless communication with the wireless device in the second wireless system.

8 Claims, 25 Drawing Sheets

(51) Int. Cl.
    *H04W 52/24*     (2009.01)
    *H04W 72/04*     (2009.01)

(56) References Cited

U.S. PATENT DOCUMENTS

| | | | |
|---|---|---|---|
| 2013/0336155 A1* | 12/2013 | Jantti | H04W 52/244 370/252 |
| 2013/0343219 A1 | 12/2013 | Kronander | |
| 2016/0119882 A1* | 4/2016 | Liu | H04W 52/243 455/422.1 |
| 2017/0188314 A1 | 6/2017 | Mueck | |

FOREIGN PATENT DOCUMENTS

| | | |
|---|---|---|
| WO | 2014/006802 A1 | 1/2014 |
| WO | 2018/074177 A1 | 4/2018 |

OTHER PUBLICATIONS

"Signaling Protocols and Procedures for Citizens Broadband Radio Service (CBRS): Spectrum Access System (SAS)—SAS Interface Technical Specification," Wireless Innovation Forum, Document WINNF-TS-0096, Version 1.3.2, Mar. 11, 2020, 1-44 pages.
Ryo Sawai: "Output power management for TVWS network coexistence Date: Nov. 8, 2010, IEEE 802.19-10/160r0, Nov. 1, 2010 (Nov. 1, 2010) pp. 1-17,XP055627891,Retrieved from the Internet: URL:Uploaded on Oct. 2, 2019 through CiteNPL [retrieved an Oct. 2, 2019]" pp. 5, 8.

\* cited by examiner

1

WIRELESS DEVICE, TERMINAL, METHOD, AND COMPUTER PROGRAM

CROSS-REFERENCE TO RELATED APPLICATIONS

The present application is based on PCT filing PCT/JP2019/020967, filed May 27, 2019, which claims priority to JP 2018-105899, filed Jun. 1, 2018, the entire contents of each are incorporated herein by reference.

TECHNICAL FIELD

The present disclosure relates to a wireless device, a terminal, a method, and a computer program.

BACKGROUND ART

Due to a wireless environment in which various wireless systems coexist and an increase and diversification of an amount of content via wireless communication in recent years, a problem that radio wave resources (frequency) that can be allocated to a wireless system is exhausted has come to the surface. However, it has been found that it is difficult to allocate new radio wave resources because existing wireless systems have already used all radio wave bands. Therefore, in order to generate necessary radio resources, use and utilization of radio waves of the existing wireless system that are idle in terms of time and space (white space) by utilizing cognitive radio technology have began to be sought (dynamic frequency sharing (dynamic spectrum access: DSA)). In recent years, in the United States, aiming to open, to the general public, the Federal use band (3.55 to 3.70 GHz) overlapping with a frequency band that is worldwide used as 3GPP band 42, 43, legalization and standardization of citizens broadband radio service (CBRS), which utilizes frequency sharing technology, are accelerating.

Furthermore, the cognitive wireless technology contributes not only to the dynamic frequency sharing but also to improvement of a frequency use efficiency of a wireless system. For example, ETSI EN 303 387 and IEEE 802.19.1-2014 define coexistence technology of wireless systems that uses the white space. In addition, Wireless Innovation Forum (WinnForum) has established a standard, called SAS-SAS Protocol, for information exchange between a plurality of SASs, each of which is a frequency management database in CBRS, shown in Non-Patent Document 1.

CITATION LIST

Non-Patent Document

Non-Patent Document 1: "Signaling Protocols and Procedures for Citizens Broadband Radio Service (CBRS): Spectrum Access System (SAS)-SAS Interface Technical Specification", WINNF-TS-0096, Internet <URL: https://workspace.winnforum.org/higherlogic/ws/public/document?document_id=4813>

SUMMARY OF THE INVENTION

Problems to be Solved by the Invention

In interference control, it is important to prevent cumulation of interference from a plurality of communication devices from exceeding an allowable value of a system to be protected.

Therefore, the present disclosure proposes a new and improved wireless device, terminal, method, and computer program capable of appropriately and effectively distributing an interference margin and avoiding interference with a system to be protected.

Solutions to Problems

According to the present disclosure, there is provided a wireless device including an acquisition unit that acquires a distribution amount of an interference margin to a second wireless system that shares a part or a whole of a frequency allocated to a first wireless system, from a device that manages one or more of the second wireless systems, and a control unit that determines, from the interference margin, a distribution amount of the interference margin to a terminal that performs wireless communication with the wireless device in the second wireless system.

Furthermore, according to the present disclosure, there is provided a terminal including an acquisition unit that acquires information regarding a second wireless system that shares a part or a whole of a frequency allocated to a first wireless system, from a wireless device that performs wireless communication with the terminal in the second wireless system, and a control unit that determines a transmission power for the wireless communication with the wireless device in the second wireless system, by use of the information acquired by the acquisition unit.

Furthermore, according to the present disclosure, there is provided a method including executing, by a processor, acquiring a distribution amount of an interference margin to a second wireless system that shares a part or a whole of a frequency allocated to a first wireless system, from a device that manages one or more of the second wireless systems, and determining, from the interference margin, a distribution amount of the interference margin to a terminal that performs wireless communication with the processor in the second wireless system.

Furthermore, according to the present disclosure, there is provided a method including executing, by a processor, acquiring information regarding a second wireless system that shares a part or a whole of a frequency allocated to a first wireless system, from a wireless device that performs wireless communication with the processor in the second wireless system, and determining a transmission power for the wireless communication with the wireless device in the second wireless system, by use of the acquired information.

According to the present disclosure, there is provided a computer program that causes a computer to execute acquiring a distribution amount of an interference margin to a second wireless system that shares a part or a whole of a frequency allocated to a first wireless system, from a device that manages one or more of the second wireless systems, and determining, from the interference margin, a distribution amount of the interference margin to a terminal that performs wireless communication with the computer in the second wireless system.

According to the present disclosure, there is provided a computer program that causes a computer to execute acquiring information regarding a second wireless system that shares a part or a whole of a frequency allocated to a first wireless system, from a wireless device that performs wireless communication with the computer in the second wireless system, and determining a transmission power for the wireless communication with the wireless device in the second wireless system, by use of the acquired information.

Effects of the Invention

As described above, according to the present disclosure, it is possible to provide a new and improved wireless device, terminal, method, and computer program capable of appropriately and effectively distributing an interference margin and avoiding interference with a system to be protected.

Note that the above effect is not necessarily limited, and any of the effects shown in the present specification or other effects that can be grasped from the present specification may be exhibited together with or in place of the above effect.

MODE FOR CARRYING OUT THE INVENTION

Figure 1:
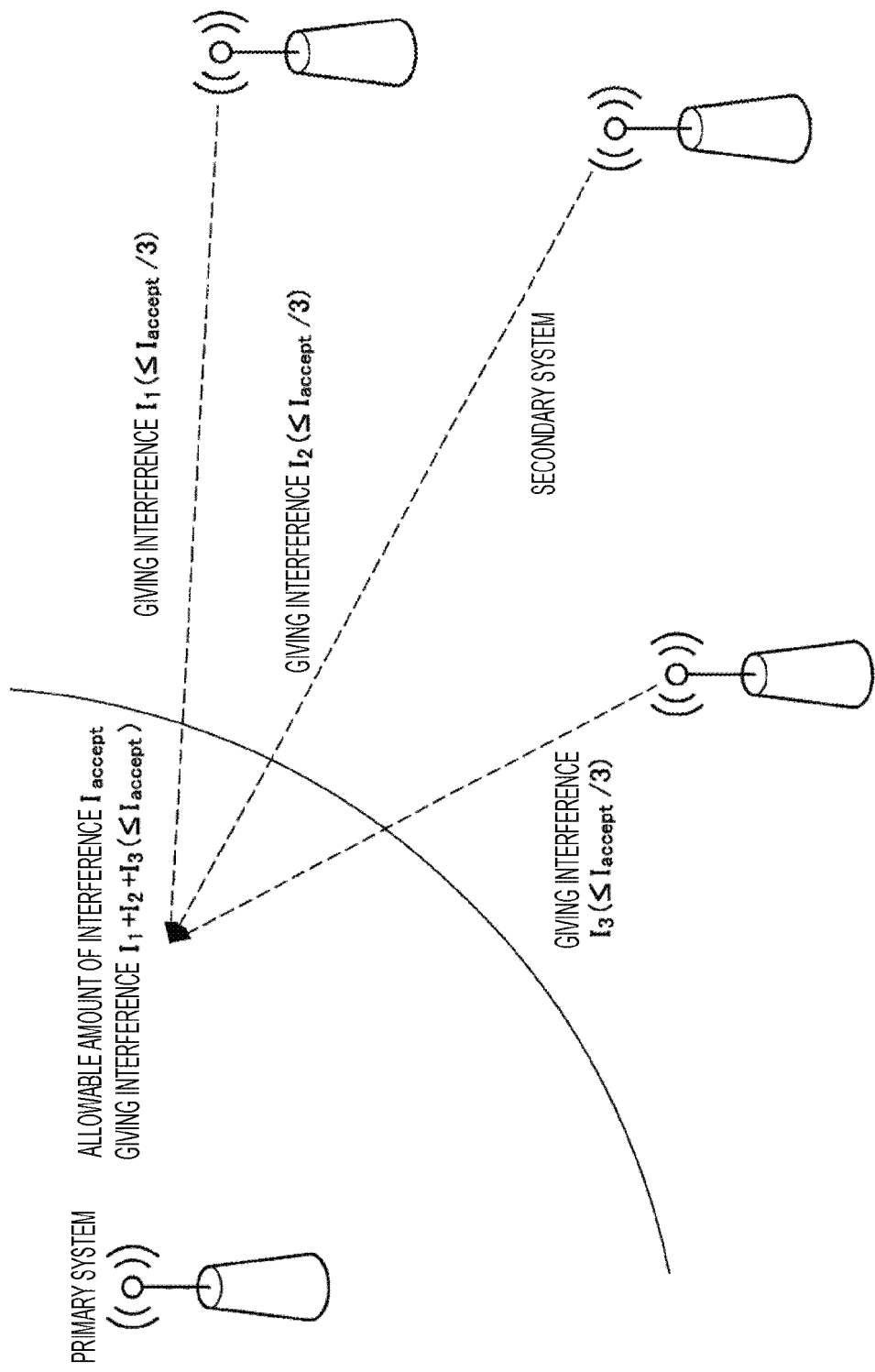
FIG. 1 is an explanatory diagram illustrating an example of allocating an interference margin to secondary systems.

Hereinafter, a preferred embodiment of the present disclosure will be described in detail with reference to the accompanying drawings. Note that, in the present specification and the drawings, components having substantially the same functional configuration are denoted by the same reference numeral, and thus redundant description will be omitted.

Note that the description will be made in the following order.

1. Embodiment of Present Disclosure
1.1. Background
1.2. Overview
1.3. Interference Control Method
1.4. Configuration Example
2. Summary 1. Embodiment of Present Disclosure

[1.1. Background]

Before describing the embodiment of the present disclosure in detail, a background of the embodiment of the present disclosure will be described.

In frequency sharing, it is important to control interference from a secondary system so as not to give fatal interference to a primary system. More specifically, it is important that a frequency management database controls a plurality of communication devices so that cumulation of interference (interference aggregation) from the communication devices does not exceed an allowable value of the primary system.

For example, ECC Report 186 and CBRS Requirements disclose that an interference tolerance of the primary system is defined as "interference margin", the interference margin is distributed to the plurality of communication devices, and whether or not secondary frequency use is possible is determined on the basis of the distributed interference margin. The distributed interference margin (interference tolerance) is used as a reference, and a maximum transmission power (maximum allowable transmission power) allowed for a communication device is calculated by a back-calculation from a propagation loss, an antenna gain, and the like, so that the interference margin can be applied to the communication devices.

FIG. 1 is an explanatory diagram illustrating an example of allocating the interference margin to secondary systems. When an allowable amount of interference is given, the amount is distributed to a plurality of secondary systems, and radio waves are transmitted on the basis of the distributed allowable amount of interference (that is, margin per device), so that fatal interference to the primary system can be suppressed. In the example of FIG. 1, a method is conceivable in which the allowable amount of interference of the primary system is $I_{accept}$, and interferences given to the primary system by the secondary systems are $I_1$, $I_2$, and $I_3$, respectively, and the allowable amount of interference is allocated so that a sum of $I_1$, $I_2$, and $I_3$ is equal to or less than $I_{accept}$. However, this method may be excessive suppression depending on a propagation environment or the like, and thus WinnForum Requirement ("Requirements for Commercial Operation in the U.S. 3550-3700 MHz Citizens Broadband Radio Service Band", WINNF-TS-0112. https://workspace.winnforum.org/higherlogic/ws/public/document?document_id=4743) requires a method called iterative allocation process (IAP).

However, a communication device does not always apply the maximum allowable transmission power calculated by the frequency management database. As an example, it may be assumed that the communication device does not apply the maximum allowable transmission power for the following reason. For example, in a case where radio waves can be transmitted only below the maximum allowable transmission power due to hardware restrictions of the communication device, the communication device may not apply the maximum allowable transmission power. In addition, for example, in a case where the communication device has not passed a spectrum mask test (implemented by a public institution) when applying the calculated maximum allowable transmission power although the maximum allowable transmission power is applicable regarding the hardware restrictions of the communication device, the communication device may not apply the maximum allowable transmission power. Furthermore, for example, due to a network planning, the communication device may be operated at a power lower than the maximum allowable transmission power. In addition, for example, since the desired maximum allowable transmission power value cannot be obtained, an operation on the channel may be abandoned. In such cases, the interference margin distributed to the communication device is left over. This interference margin left over is also referred to as "residual interference margin" hereinafter.

Furthermore, in the above example, the maximum transmission power (maximum allowable transmission power) is calculated from the interference margin and applied to the communication device, as an example, but as another approach, it is also possible that the communication device may notify the frequency management database of the desired maximum transmission power and, the frequency management database may determine whether or not an estimated value of interference that may occur due to the desired maximum transmission power satisfies the interference margin. In such a case, when the estimated interference value exceeds the interference margin, it is assumed that the frequency management database rejects the desired maximum transmission power to the communication device. Therefore, in this case, the interference margin may be the residual interference margin.

Although a method and the like of distributing the interference margin have been disclosed in various documents and much discussion has been made, handling of the residual interference margin, which is an interference margin left over, has not been disclosed so far.

In CBRS, it is required that a plurality of frequency management databases (spectrum access system: SAS) cooperates with each other to perform radio wave management. In WinnForum SAS-SAS Protocol TS, a message exchange format called Full Activity Dump Message is defined, and it is determined that all communication device information and the like necessary for interference control are periodically exchanged. In such a case where a plurality of frequency management databases is required to be coordinated, it is considered that being capable of accommodating another device with the residual interference margin depending on the situation contributes to improvement of the frequency utilization efficiency.

Therefore, in view of the above-described points, the present discloser has diligently studied technology capable of appropriately accommodating another device with an interference margin distributed to a communication device depending on the situation. As a result, the present discloser has devised the technology capable of appropriately accommodating another device with an interference margin distributed to a communication device depending on the situation, as described below.

[1.2. Overview]

Figure 2:
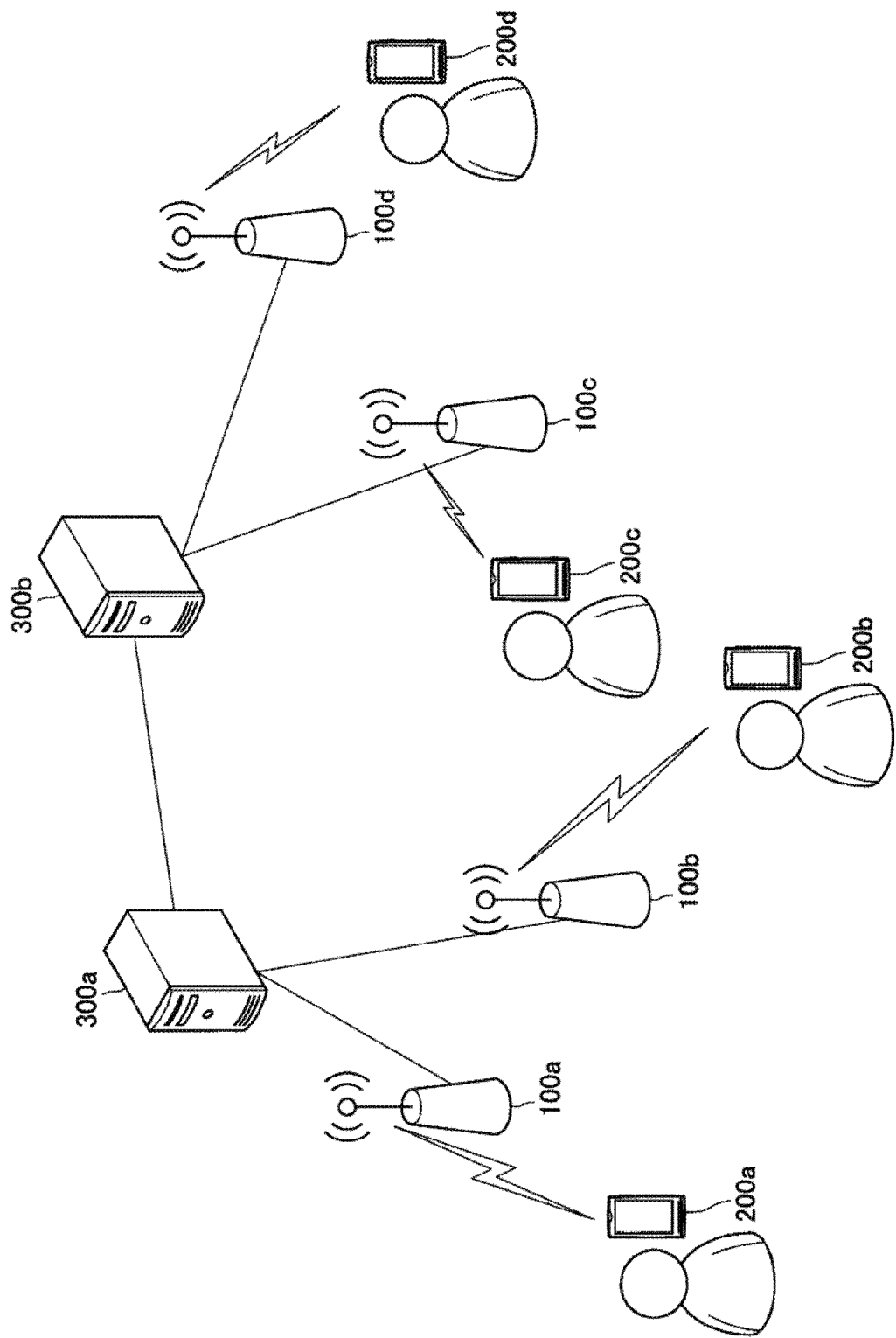
FIG. 2 is an explanatory diagram illustrating a configuration example of a wireless system according to an embodiment of the present disclosure.

First, a configuration example of a wireless system according to the embodiment of the present disclosure will be described. FIG. 2 is an explanatory diagram illustrating the configuration example of the wireless system according to the embodiment of the present disclosure. FIG. 2 illustrates wireless devices 100a to 100d, terminals 200a to 200d that wirelessly communicate with the respective wireless devices, and communication control devices 300a and 300b that control base stations.

The wireless devices 100a to 100d are typically devices corresponding to wireless base stations, access points, or wireless relay stations. The wireless devices 100a to 100d may be fixed or may be installed in moving objects such as automobiles. Wireless access technology used by the wireless devices 100a to 100d is not limited to a specific one. Furthermore, coverages of the wireless devices 100a to 100d may be large like macrocells or small like picocells. In addition, in a case where the wireless devices 100a to 100d have capability of beamforming, a cell or a service area may be formed for each beam. Typically, one wireless device is installed and operated by one business operator or one individual, but the present disclosure is not limited to this. The wireless devices 100a to 100d may be shared facilities used by a plurality of business operators or a plurality of individuals. In this case, the wireless devices 100a to 100d may be installed and operated by a third party different from a user.

The terminals 200a to 200d are typically communication equipment such as smartphones. The terminals 200a to 200d do not necessarily have to be used by a person, and for example, devices such as factory machines and sensors installed in buildings may be network-connected. Furthermore, as represented by device to device (D2D), the terminals 200a to 200d may have a relay communication function. In addition, the terminals 200a to 200d may be devices called customer premises equipment (CPE) used in a wireless backhaul or the like.

Figure 3:
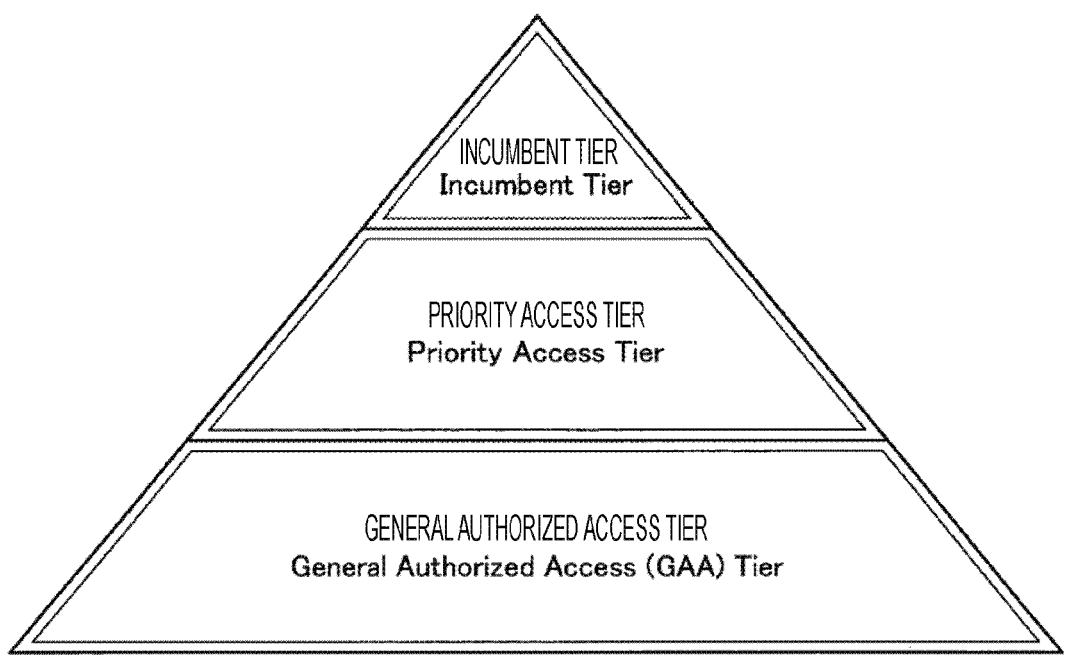
FIG. 3 is an explanatory diagram illustrating a hierarchical structure of a CBRS use.

The communication control devices 300a and 300b are devices that determine and give an instruction on operation parameters of the wireless devices 100a to 100d. For example, the communication control devices 300a and 300b may be network managers that integrally control wireless devices in a network, or control devices such as spectrum managers and coexistence managers that perform control of radio wave interference between wireless devices, which is represented by ETSI EN 303 387 and IEEE 802.19.1-2014. In a frequency sharing environment, a database server such as geolocation database (GLDB) or spectrum access system (SAS) can be further included in the communication control devices 300a and 300b. Although there may be only one communication control device in one system, in a case where there is the plurality of communication control devices 300a and 300b as illustrated in FIG. 3, the communication control devices 300a and 300b exchange, with each other, information of wireless devices managed by the communication control devices 300a and 300b, and perform necessary frequency allocation and interference control calculation. Basically, control targets of the communication control devices 300a and 300b are the wireless devices 100a to 100d, but the communication control devices 300a and 300b may control the terminals 200a to 200d with which the wireless devices 100a to 100d perform wireless communication.

In the present embodiment, the description will be made assuming the frequency sharing environment. As an example, in the citizens broadband radio service (CBRS) legislated by the Federal Communications Commission (FCC) in the United States, the primary system is a military radar, a grandfathered wireless system, and a fixed satellite service (radio wave transmission from space to earth), and the secondary system is a wireless system called citizens broadband radio service device (CBSD), as illustrated in a figure below. The secondary system further has priority, and a priority access license (PAL) that allows license use of a shared band and a general authorized access (GAA) that is equivalent to license-free are defined. Of course, the wireless system is not limited to these when the present disclosure is implemented. Another wireless system may be the primary system. Furthermore, a frequency sharing environment in another frequency band may be used. In addition, the present disclosure is not limited to the frequency sharing. The technology of the present disclosure may be applied to a scenario of network coexistence between the same or different wireless systems that use the same frequency.

Figure 4:
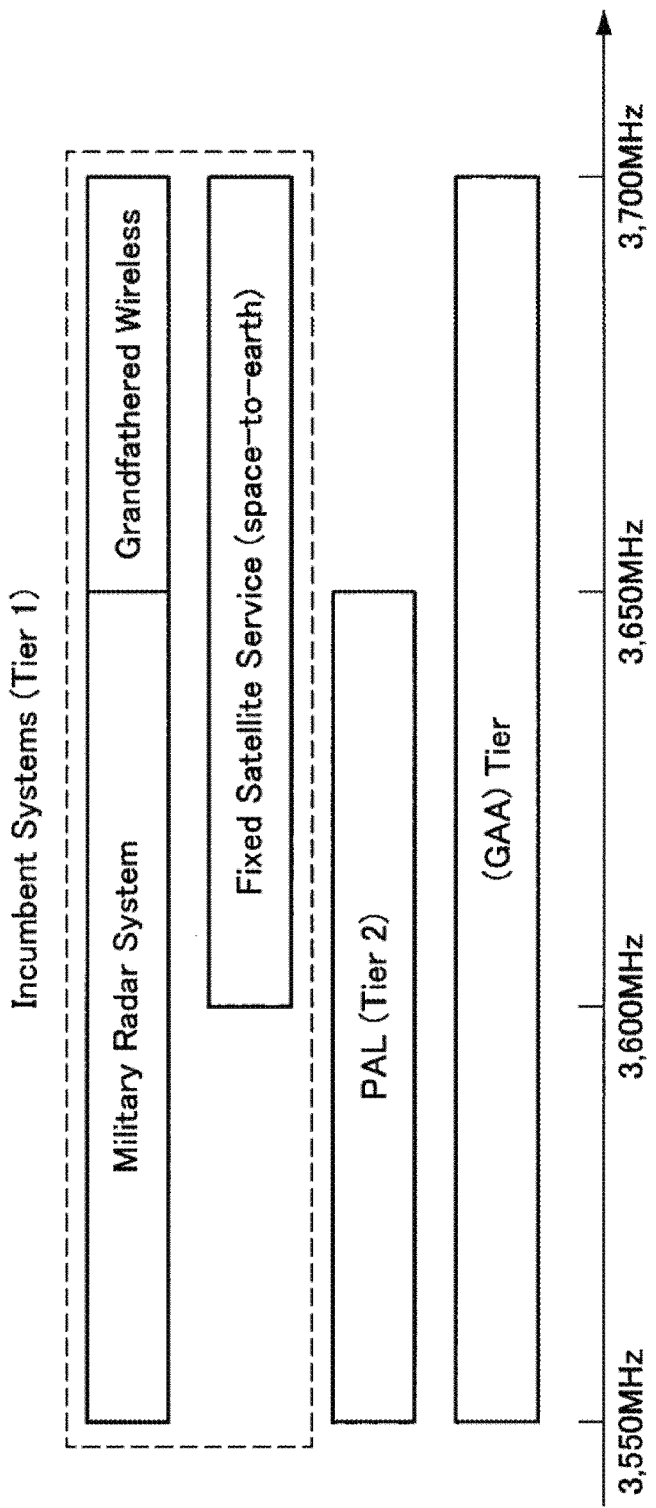
FIG. 4 is an explanatory diagram illustrating a CBRS band.

FIG. 3 is an explanatory diagram illustrating a hierarchical structure of a CBRS use. There are a priority access tier above a general authorized access tier and an incumbent tier above the priority access tier. Furthermore, FIG. 4 is an explanatory diagram illustrating a CBRS band. In the present embodiment, it is assumed that bands of the general authorized access tier, the priority access tier, and the incumbent tier are defined as illustrated in FIG. 4.

Figure 5:
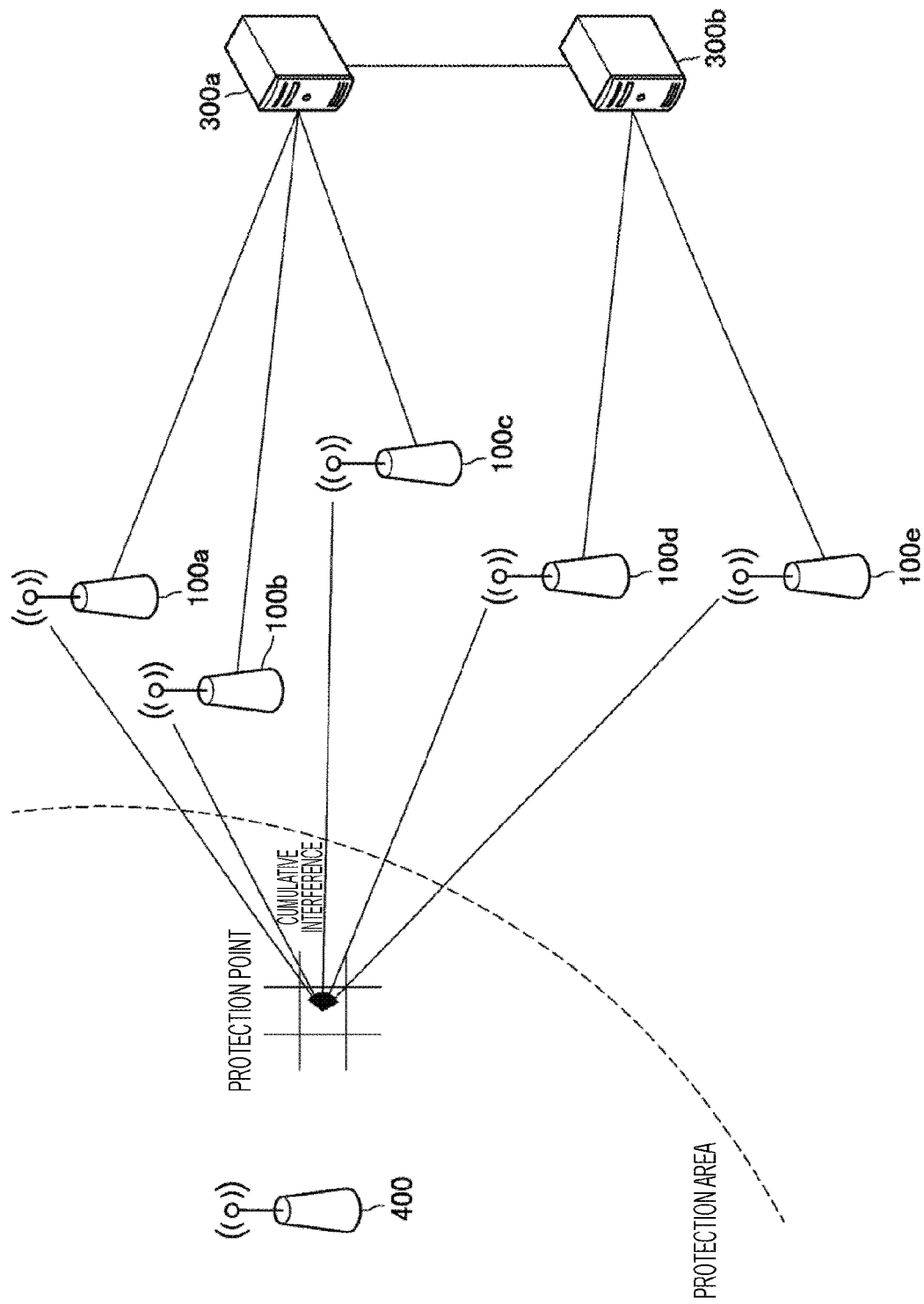
FIG. 5 is an explanatory diagram illustrating an example of an interference model assumed in the present embodiment.

Next, an example of an interference model is shown. FIG. 5 is an explanatory diagram illustrating an example of the interference model assumed in the present embodiment. FIG. 5 is an explanatory diagram illustrating interference that the wireless devices 100a and 100b give to a certain protection point in a protection area of a primary system 400. The example of FIG. 5 is an interference model applied to a system having a service area, such as the grandfathered wireless, and considers an interference amount at a plurality of protection points set in the protection area.

[1.3. Interference Control Method]

Next, an interference control method by a communication control device 300 according to the embodiment of the present disclosure will be described.

(1.3.1. Interference Margin Distribution)

An allowable interference threshold of the primary system is $I_{accept}$. This threshold may be an actual threshold, or may be a value that is set in consideration of a certain degree of margin (for example, a protection ratio) from the actual threshold, in consideration of error and fluctuation.

The interference control means determining a transmission power (EIRP, a conducted power+an antenna gain, or the like) of a wireless device so as not to exceed this allowable interference threshold $I_{accept}$. At this time, if there are many wireless devices and each of the wireless devices does not exceed the allowable interference threshold, an interference power received in the primary system may exceed the allowable interference threshold. Therefore, it is typical to "distribute" the allowable interference amount on the basis of the number of wireless devices registered in the communication control device.

Figure 6:
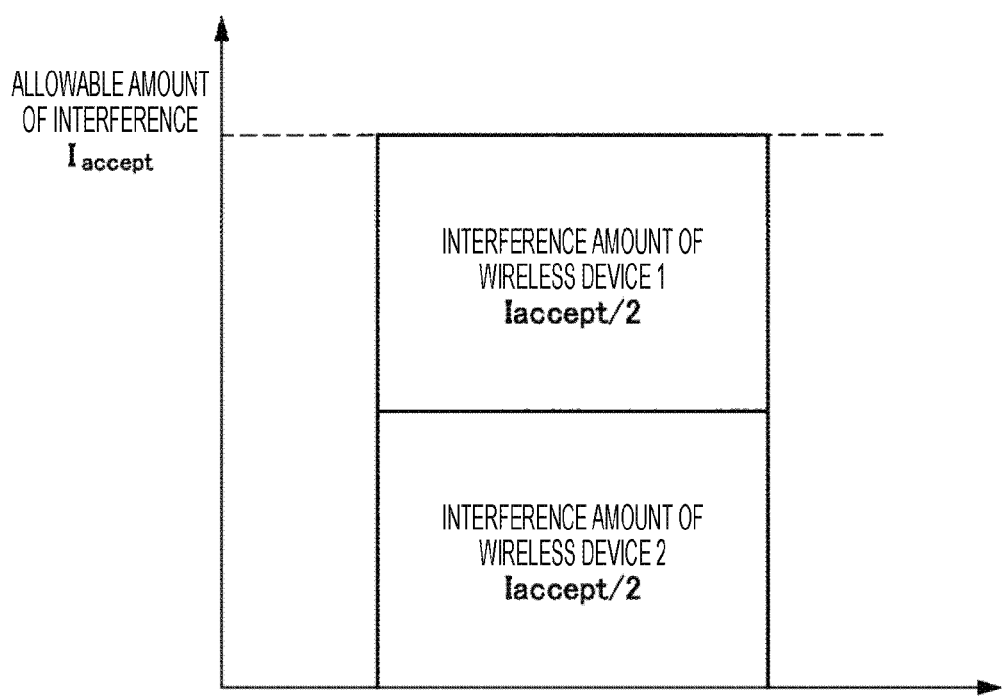
FIG. 6 is an explanatory diagram illustrating a distribution example of the interference margin by a communication control device.

For example, in the interference model illustrated in FIG. 5, the total number of wireless devices is two. Therefore, an allowable amount of interference $I_{accept}/2$ is distributed individually. FIG. 6 is an explanatory diagram illustrating a distribution example of the interference margin by the communication control device 300. Since each of the wireless devices cannot recognize this distribution amount by itself, each of the wireless device may recognize the distribution amount through the communication control device 300, and in addition, may acquire a transmission power determined on the basis of this distribution amount.

Figure 7:
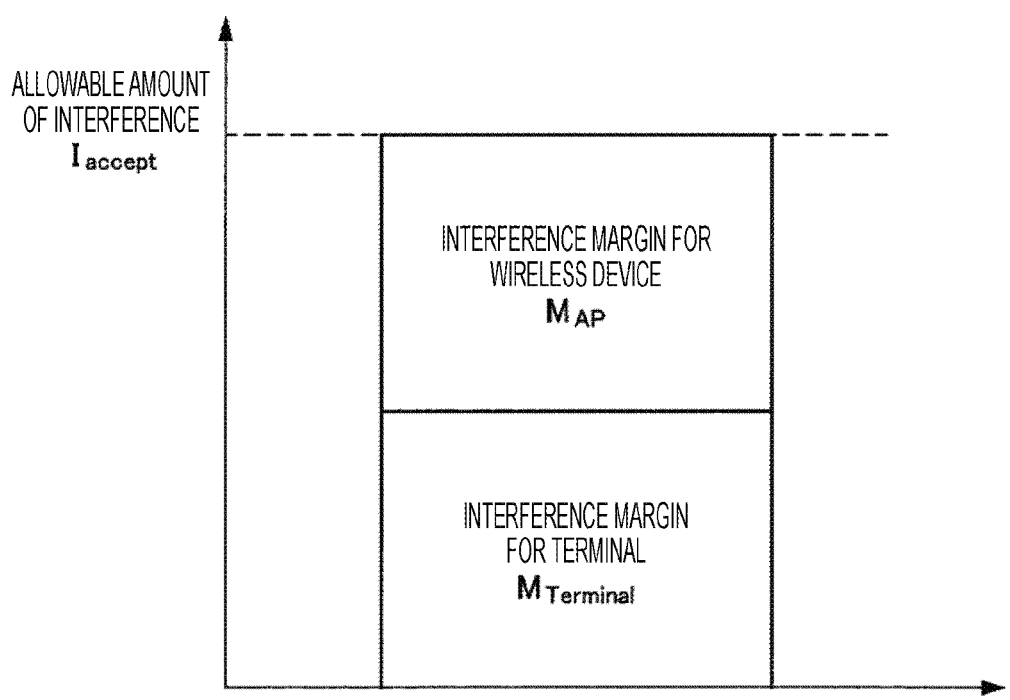
FIG. 7 is an explanatory diagram illustrating a distribution example of the interference margin by the communication control device.

In the present embodiment, furthermore, assuming that terminals also contribute to cumulative interference to the primary system, the communication control device 300 distributes the interference margin not only to the wireless devices but also to the terminals. FIG. 7 is an explanatory diagram illustrating a distribution example of the interference margin by the communication control device 300. FIG. 7 illustrates an example in which an interference margin $M_{AP}$ for the wireless device and an interference margin $M_{Terminal}$ for the terminal are each distributed. Note that a distribution ratio between the interference margin $M_{AP}$ for the wireless device and the interference margin $M_{Terminal}$ for the terminal is not limited to this example.

Figure 8:
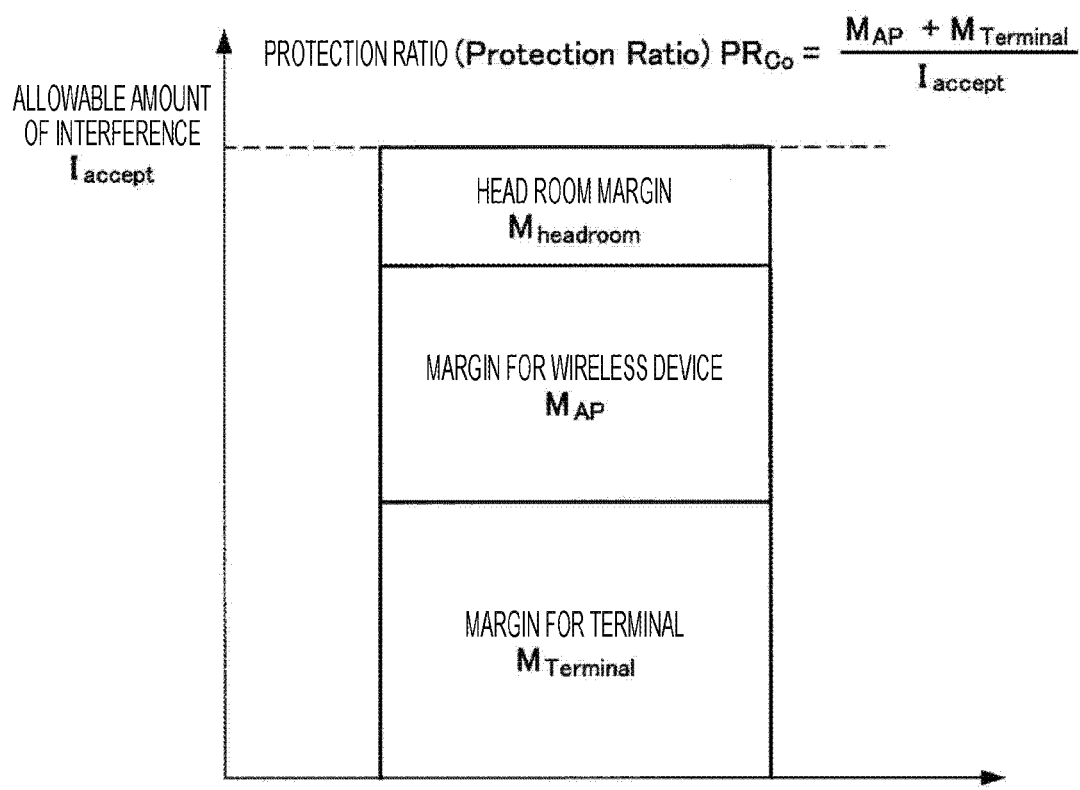
FIG. 8 is an explanatory diagram illustrating a distribution example of the interference margin by the communication control device.

The interference margin for the wireless device is a total amount of interference margins distributed to one or more wireless devices. The interference margin for the terminal is a total amount of interference margins distributed to one or more terminals. These margins are considered as a set together with the allowable interference amount. Therefore, these margins may be set for each frequency channel. Furthermore, the interference margins may be designed in consideration of the protection ratio. FIG. 8 is an explanatory diagram illustrating a distribution example of the interference margin by the communication control device 300. FIG. 8 illustrates a distribution example of the interference margin in consideration of the protection ratio.

In a case where the protection ratio is set in advance, the communication control device 300 calculates a sum of the interference margin for the wireless device and the interference margin for the terminal from values of the allowable amount of interference and the protection ratio. Here, the communication control device 300 needs to determine at what ratio the margin for the wireless device and the margin for the terminal are provided. However, at what ratio the margin for the wireless device and the margin for the terminal are provided is not determined.

Therefore, a method of setting the margin for the wireless device and the margin for the terminal will be described below. First, a basic procedure of the interference margin distribution will be described, then setting of criteria for selecting a wireless device and a terminal to which the interference margin is distributed will be described, and subsequently, determination of the ratio between the margin for the wireless device and the margin for the terminal will be described. Note that in the following description, the protection ratio will be ignored for convenience.

(1.3.2. Basic Procedure of Interference Margin Distribution)

Figure 9:
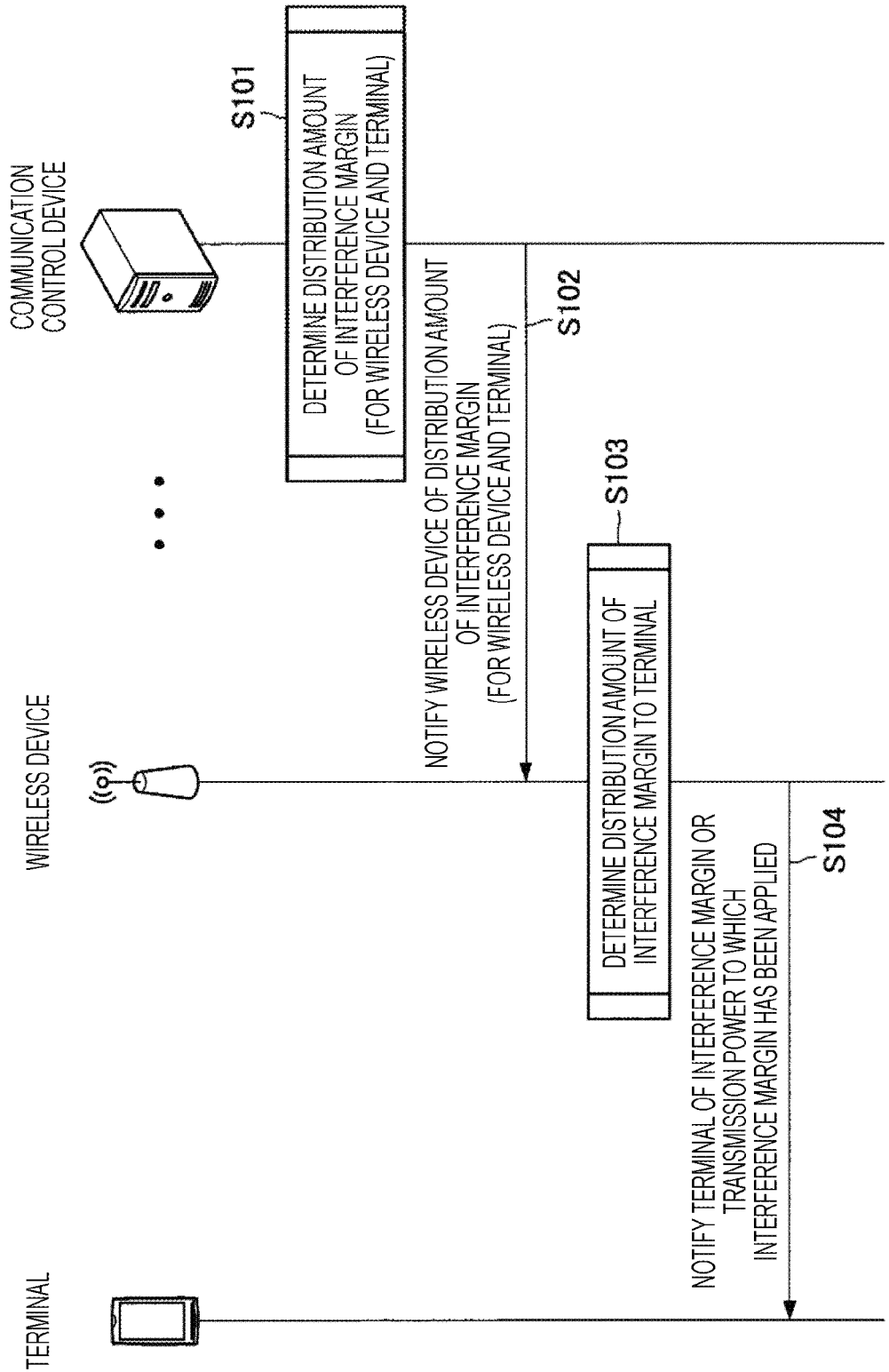
FIG. 9 is a flowchart illustrating an operation example of the wireless system according to the embodiment of the present disclosure.

First, the basic procedure of the interference margin distribution in the wireless system according to the embodiment of the present disclosure will be described. FIG. 9 is a flowchart illustrating an operation example of the wireless system according to the embodiment of the present disclosure. FIG. 9 illustrates the basic procedure of the interference margin distribution in the wireless system according to the embodiment of the present disclosure. FIG. 9 illustrates operations of a terminal 200, a wireless device 100, and the communication control device 300. Hereinafter, the operation example of the wireless system according to the embodiment of the present disclosure will be described with reference to FIG. 9.

The communication control device 300 determines a distribution amount of the interference margin for the wireless device and the terminal (step S101). When the distribution amount of the interference margin is determined, the communication control device 300 notifies the wireless device 100 of the distribution amount of the interference margin (step S102).

The wireless device 100, which has been notified of the distribution amount of the interference margin, determines a distribution amount of the interference margin to the terminal 200 on the basis of information regarding the distribution amount (step S103). When the wireless device 100 determines the distribution amount of the interference margin to the terminal 200, the wireless device 100 then notifies the terminal 200 of the interference margin or a transmission power to which the interference margin has been applied (step S104).

Hereinafter, processing of step S101 in the operation illustrated in FIG. 9 will be described in detail.

(1.3.3. Criteria for Selecting Interference Margin Distribution Target)

In general, the terminal 200 is located at a position lower than that of the wireless device 100, and communicates at a lower transmission power than that of the wireless device 100. Therefore, it is considered desirable that the wireless device 100 and the terminal 200 are selected on the basis of different criteria.

Figure 10:
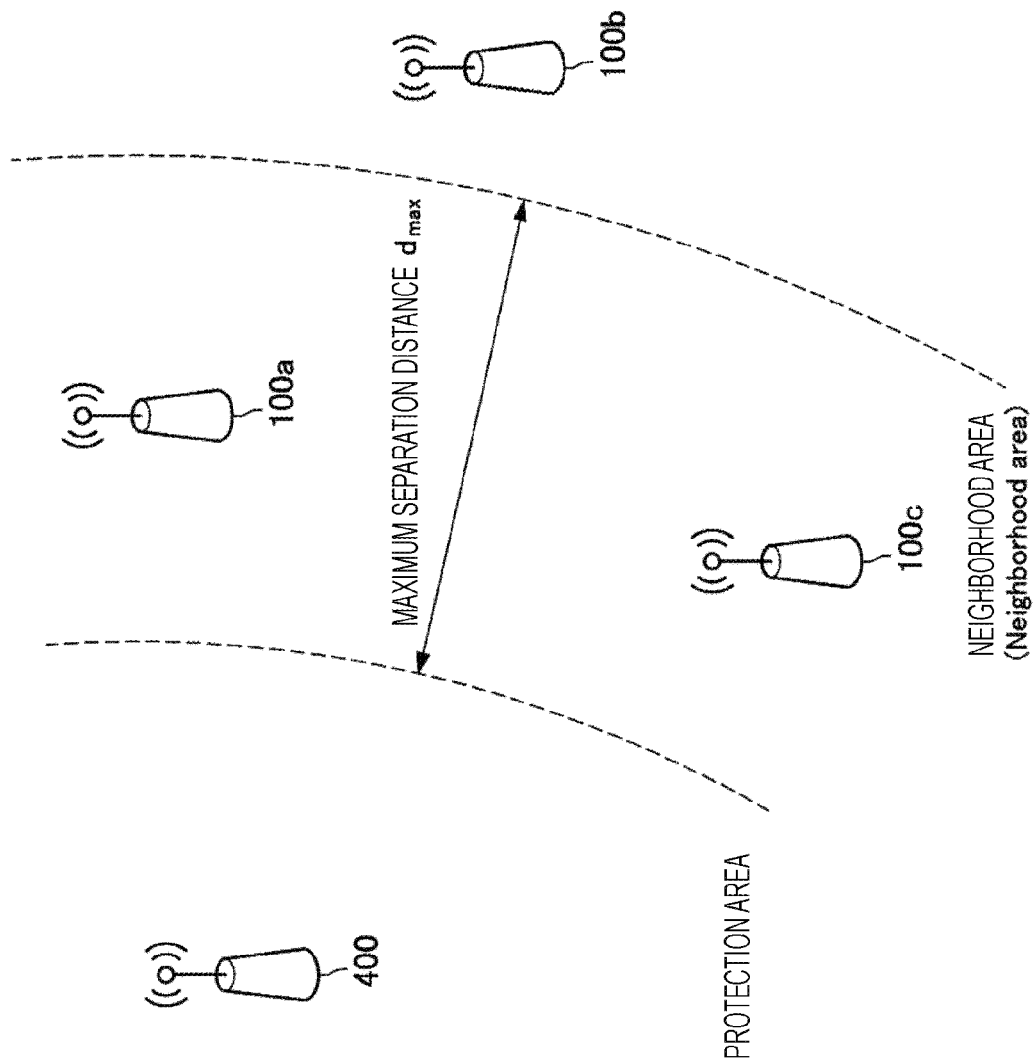
FIG. 10 is an explanatory diagram illustrating an example of selecting a wireless device to which the interference margin is distributed.

FIG. 10 is an explanatory diagram illustrating an example of selecting the wireless device to which the interference margin is distributed. For the wireless device 100, typically, a position of the wireless system to be protected or a distance to the protection area is provided as a reference. In FIG. 10, the wireless device 100a and 100c whose distance from the protection area of the primary system to be protected is a maximum separation distance $d_{max}$ or less is a distribution target of the interference margin, and the wireless device 100b whose distance from the protection area of the primary system to be protected exceeds the maximum separation distance $d_{max}$ is excluded from the distribution target of the interference margin. In the following description, a range that does not include the protection area of the primary system to be protected and whose distance from the protection area is the maximum separation distance $d_{max}$ or less is referred to as a neighborhood area.

Furthermore, different neighborhood areas may be set for the wireless device and the terminal, and a wireless device and a terminal located in the respective neighboring areas may be distribution targets of the interference margin.

Figure 11:
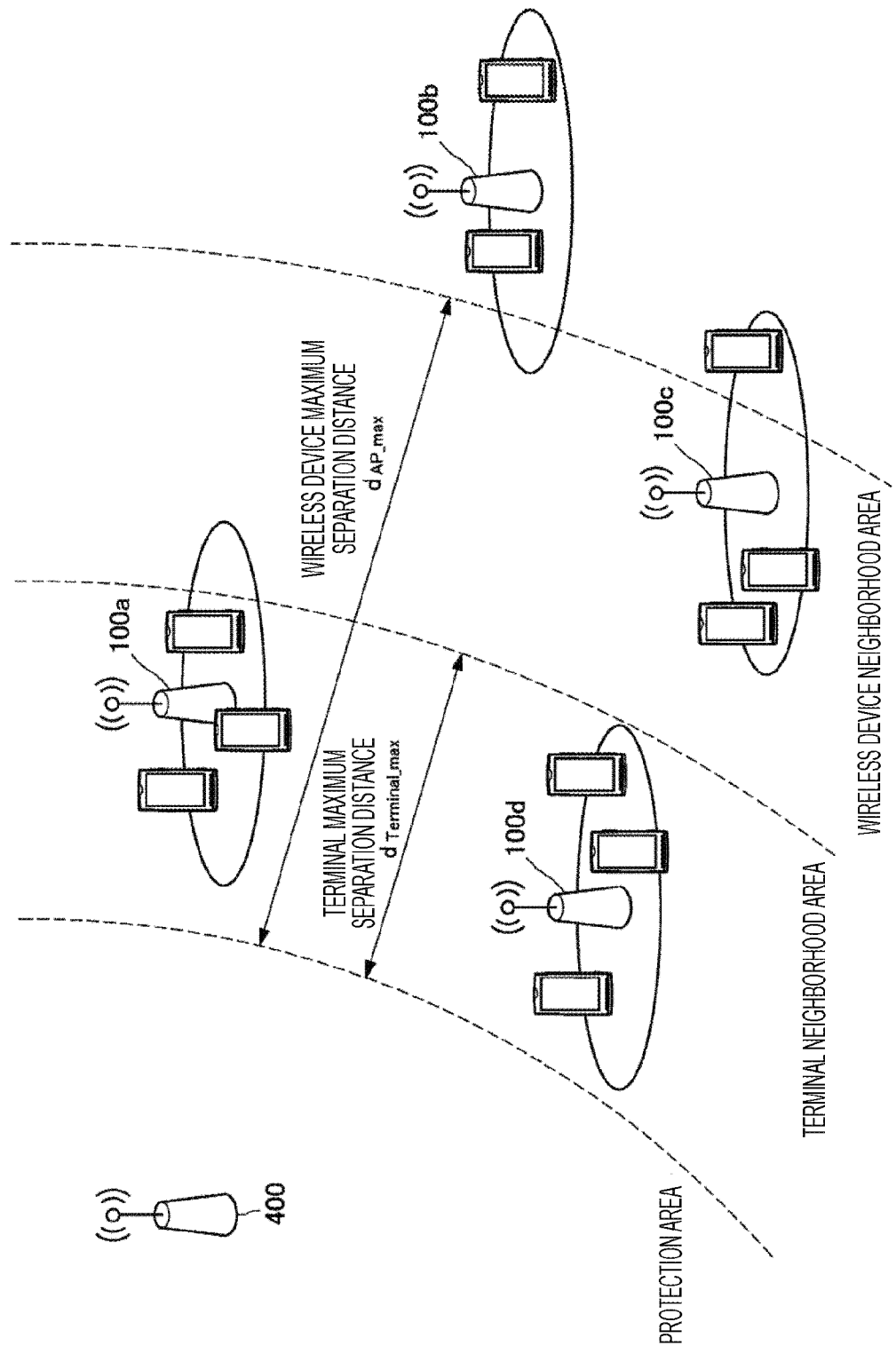
FIG. 11 is an explanatory diagram illustrating an example of selecting the wireless device and a terminal to which the interference margin is distributed.

FIG. 11 is an explanatory diagram illustrating an example of selecting the wireless device and the terminal to which the interference margin is distributed. FIG. 11 illustrates a neighborhood area for the wireless device (wireless device neighborhood area) and a neighborhood area for the terminal (terminal neighborhood area) having a narrower range than the wireless device neighborhood area. Furthermore, in the example of FIG. 11, three wireless devices exist in the wireless device neighborhood area and six terminals exist in the terminal neighborhood area. Therefore, these wireless devices and terminals are the distribution targets of the interference margin.

The communication control device 300 may determine whether or not the terminal 200 exists in the terminal neighborhood area on the basis of position information of the terminal 200. Furthermore, in a case where the terminal 200 cannot acquire or cannot use the position information, the communication control device 300 may select, as the distribution target of the interference margin, the terminal 200 that performs wireless communication with the wireless device 100 located in the terminal neighborhood area. In a case where the terminal 200 that performs the wireless communication with the wireless device 100 located in the terminal neighborhood area is the distribution target of the interference margin, in the example of FIG. 11, terminals 200 that perform the wireless communication with the wireless devices 100a and 100d are selected as the distribution targets of the interference margin.

An example of setting a terminal maximum separation distance $d_{Terminal, max}$, which is a reference of the terminal neighborhood area, will be described.

The maximum transmission power of the wireless device 100 is typically higher than that of the terminal 200. Therefore, the terminal maximum separation distance $d_{Terminal, max}$ may be set so as to guarantee a maximum transmission power difference. Specifically, in a case where the maximum transmission power of the wireless device is expressed as $P_{AP, Tx, Max}$, the maximum transmission power of the terminal is expressed as $P_{Terminal, Tx, Max}$, and a propagation loss at a distance d is expressed as PL(d), the terminal maximum separation distance $d_{Terminal, max}$ may be set as in the following Expression (1).

[Math. 1]

$$d_{Terminal,Max} = PL^{-1}((P_{Terminal,Tx,Max} - P_{AP,Tx,Max}) + PL(d_{AP,Max})) \quad (1)$$

A derivation process of the above expression (1) will be shown. An estimated interference power at an edge of the protection area obtained in a case where it is assumed that the wireless device 100 emits radio waves from an edge of the wireless device neighborhood area set for the wireless device 100 is made equal to an estimated interference power at an edge of the protection area obtained in a case where it is assumed that the terminal 200 emits radio waves from an edge of the terminal neighborhood area to be set for the terminal 200. This is expressed by the following expression.

[Math. 2]

$$P_{AP,Tx,Max} - PL(d_{AP,Max}) = P_{Terminal,Tx,Max} - PL(d_{Terminal,Max}) \quad (2)$$

Transposing Expression (2) gives Expression (3).

[Math. 3]

$$PL(d_{Terminal,Max}) = (P_{Terminal,Tx,Max} - P_{AP,Tx,Max}) + PL(d_{AP,Max}) \quad (3)$$

Therefore, Expression (1) can be derived from Expression (3).

At this time, a value defined by law (for example, 23 [dBm/10 MHz] in the case of CBRS) may be used for the maximum transmission power of the terminal. Alternatively, in a case where the terminal 200 performs uplink transmission power control, an uplink transmission power value of the terminal 200 existing near a cell edge of the wireless device 100 may be acquired or estimated to be used for the maximum transmission power of the terminal.

In addition, a position of a terminal that gives a certain amount of interference may be measured to set the terminal neighborhood area. In this method, which considers the terrain and the like, the terminal maximum separation distance $d_{Terminal,\ max}$ changes depending on the position. Therefore, an arbitrary number of points are set on the edge of the protection area, distances from the points are gradually changed, and the interference given by the terminal is calculated. Points below an arbitrary interference amount are then plotted, and the points are connected, to form the terminal neighborhood area.

The example of selecting the wireless device and the terminal to which the interference margin is distributed by the communication control device 300 is not limited to the above. In addition to the above, the protection area of the wireless system to be protected may be divided into grids of an arbitrary size, and the communication control device 300 may determine whether or not radio waves from the wireless device or the terminal reach the grids, to select the wireless device to which the interference margin is distributed.

(1.3.4. Setting of Distribution Ratio of Interference Margin)

Next, a method of setting a distribution ratio when the interference margin is distributed between the terminal 200 and the wireless device 100 will be described.

The communication control device 300 may determine the distribution ratio of the interference margin in accordance with the number of terminals 200 and wireless devices 100 to which the interference margin is distributed. Assuming that the number of the wireless devices 100 to which the interference margin is distributed is NAP and the number of the terminals 200 to which the interference margin is distributed is $N_{Terminal}$ the interference margin $M_{AP}$ for the wireless device and the interference margin $M_{Terminal}$ for the terminal can be each obtained as follows.

[Math. 4]

$$M_{AP} = \frac{N_{AP}}{N_{AP} + N_{Terminal}} I_{accept} \quad (4)$$

$$M_{Terminal} = \frac{N_{Terminal}}{N_{AP} + N_{Terminal}} I_{accept}$$

However, in practice, it is considered to be extremely rare that all of the wireless devices 100 and the terminals 200 selected as the distribution targets of the interference margin transmit radio waves simultaneously by a wireless communication system or the like used by the wireless devices 100 and the terminals 200 for communication. Therefore, in the present embodiment, the communication control device 300 may acquire wireless communication system information from the wireless device 100, utilize this information to count the number, and determine the distribution amount.

The communication control device 300 may acquire, as the wireless communication system information, information indicating access technology or information indicating an access method from the wireless device 100. The information indicating the access technology may be an identifier indicating LTE, Wi-Fi, 5G new radio (NR), or the like, or a release number thereof. The information indicating the access method may be time division duplex (TDD), full duplex, or listen-before-talk (LBT). In a case where the TDD is acquired as the information indicating the access method, TDD configuration information, available TDD configuration information, or time information serving as a reference for synchronization between base stations may be acquired. In a case where the LBT is acquired as the information indicating the access method, category information (four categories are defined in 3GPP), available category information, or the like may be acquired.

Note that, in the present embodiment, it is not assumed that frequency division duplex (FDD) is used for communication between the wireless device 100 and the terminal 200. This is because it is extremely unlikely that the wireless device 100 and the terminal 200 emit radio waves at the same time since frequencies are different between downlink and uplink. However, the FDD is not necessarily excluded. In a case where an FDD uplink frequency of a specific terminal is the same as an FDD downlink frequency of a specific wireless device, or adjacent channel interference may be given to a system to be protected, the FDD may also be considered.

In the following description, the TDD will be focused out of the access method information. Of course, a similar method can be applied to other access methods.

Figure 12:
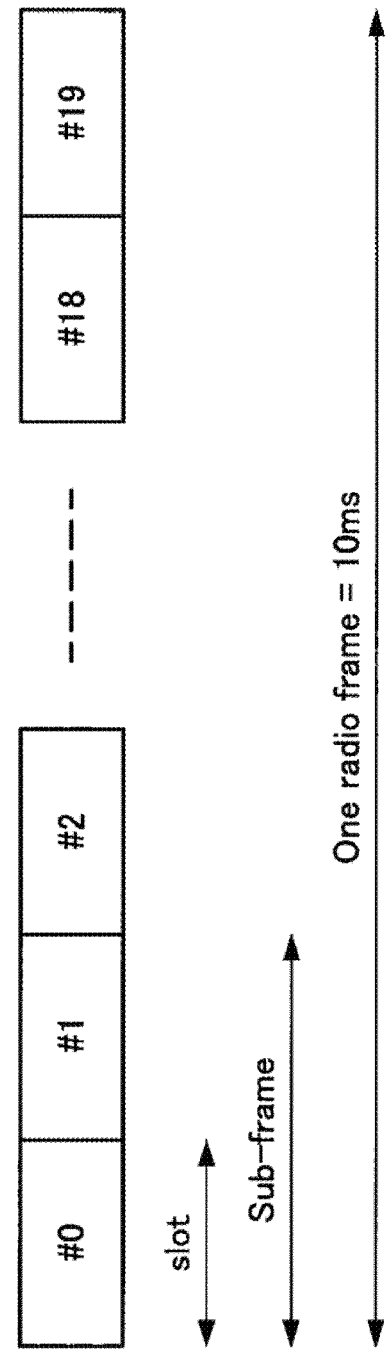
FIG. 12 is an explanatory diagram illustrating a configuration example of a frame applied to FDD.
Figure 13:
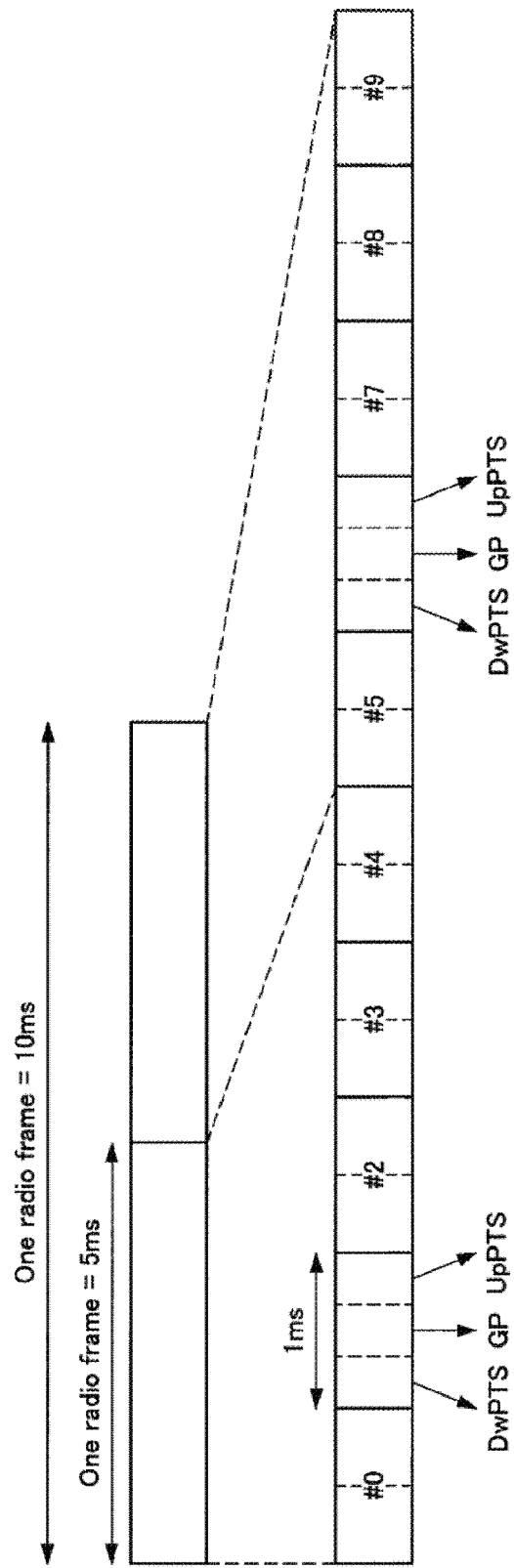
FIG. 13 is an explanatory diagram illustrating a configuration example of a frame applied to TDD.

In LTE, two types of frame configurations are supported. Furthermore, in the TDD, combinations of the uplink and the downlink are also defined, and base stations are operated in accordance with any of defined combinations. FIG. 12 is an explanatory diagram illustrating a configuration example of a frame applied to the FDD, for example. As illustrated in FIG. 12, one frame has a time length of 10 milliseconds, one frame consists of 10 subframes, and one subframe consists of two slots. Furthermore, FIG. 13 is an explanatory diagram illustrating a configuration example of a frame applied to the TDD, for example. Furthermore, Table 1 is an explanatory diagram showing setting of allocation of the uplink and the downlink in the TDD.

TABLE 1

(Allocation of uplink and downlink)

| Config- | Switch-point | Subframe number | | | | | | | | | |
|---|---|---|---|---|---|---|---|---|---|---|---|
| uration | periodicity | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 14:
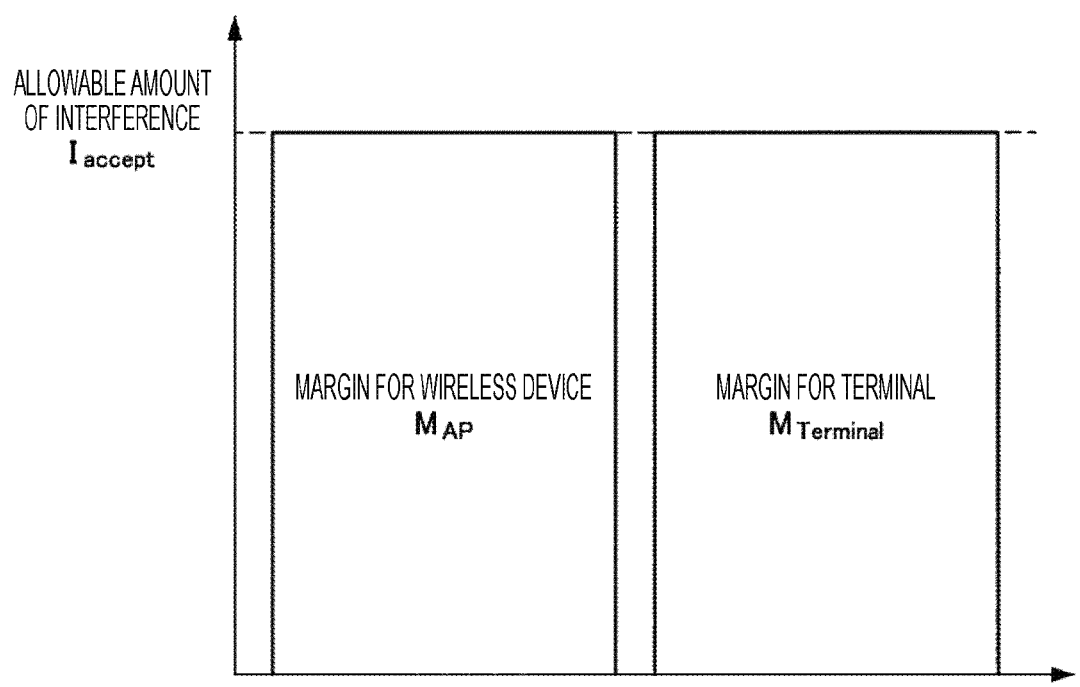
FIG. 14 is an example of setting a margin for the wireless device and a margin for the terminal.

According to Table 1, when the subframe number is 0 or 5, the downlink is performed regardless of the configuration, and when the subframe number is 2, the uplink is performed regardless of the configuration. Therefore, the communication control device 300 checks the TDD configuration of the wireless device to which the interference margin is distributed. In a case where all the wireless devices 100 set the same configuration, the communication control device 300 sets the margin for the wireless device and the margin for the terminal to be the same. That is, the margin for the wireless device and the margin for the terminal are each distributed at a rate of 100%. FIG. 14 is an example of setting the margin for the wireless device and the margin for the terminal in a case where all the wireless devices 100 set the same configuration.

In a case where different configurations are used between the wireless devices, the communication control device 300 estimates the interference that may be given to the wireless system to be protected on the basis of the combination of the uplink and downlink for each subframe number. At this time, the communication control device 300 sets an interference power in a subframe that provides the strongest interference estimation value to be lower than the allowable amount of interference of the wireless system to be protected.

For example, as illustrated in FIG. 11, it is supposed that three wireless devices are included in the wireless device neighborhood area and that two wireless devices are included in the terminal neighborhood area. Here, it is supposed that three wireless devices apply corresponding one of the TDD configurations in the following table.

TABLE 2

(Allocation of uplink and downlink)

| Configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 (Wireless device 1) | D | S | U | U | U | D | S | U | U | U |
| 1 (Wireless device 4) | D | S | U | U | D | D | S | U | U | D |
| 6 (Wireless device 3) | D | S | U | U | U | D | S | U | U | D |

Here, an interference power that may be given to the primary system to be protected is estimated for each subframe number (except for subframes in which the special subframe is set for all the wireless devices). Assuming that interference powers in respective subframe numbers are $I_0$ to $I_9$, respectively, $I_0$ to $I_9$ are as follows.

$I_0 = I_5$: (interference given by a wireless device 1)+(interference given by a wireless device 4)+(interference given by a wireless device 3)

$I_2 = I_3 = I_7$ $= I_8$: (interference given by a terminal group under the control of the wireless device 1)+(interference given by a terminal group under the control of the wireless device 4)

$I_4$: (interference given by the terminal group under the control of the wireless device 1)+(interference given by the wireless device 4)

$I_9$: (interference given by the terminal group under the control of the wireless device 1)+(interference given by the wireless device 4)+(interference given by the wireless device 3)

At this time, it is assumed that the interference power $I_9$, when the subframe number is nine, is the maximum. In a case where $I_9$ is below the interference threshold $I_{Accept}$, the communication control device 300 sets 19 to a total amount of the interference margin to be distributed to the "terminal group under the control of the wireless device 1", the "wireless device 4", and the "wireless device 3" (expressed as $M_{Terminals1}$, $M_{AP4}$, and $M_{AP3}$, respectively). Note that in a case where the interference power $I_9$ exceeds the interference threshold $I_{Accept}$, an interference reference is not satisfied, and therefore it may be determined that the interference margin is not distributed=the frequency sharing is not allowed.

The communication control device 300 then distributes a remaining interference amount ($I_{Accept-9}$) to other entities (the wireless device 1 and the terminal group under the control of the wireless device 4). A further distribution amount to other individual entities (the wireless device 1 and the terminal group under the control of the wireless device 4) can be calculated by the above method being repeated.

The margin for the wireless device and the margin for the terminal determined by a method such as the above are distributed, as the total amount of the interference margin, to each wireless device 100 and terminal 200. The distribution of the margin for the wireless device is disclosed in various documents and thus will not be described in detail, but as an example, distribution based on the number of the wireless devices is assumed. As for the margin for the terminal, in a case where the communication control device 300 knows the number of the terminals 200, the total amount is distributed on the basis of the number of the terminals 200, and the communication control device 300 notifies each wireless device 100. On the other hand, in a case where the communication control device 300 does not know the number of the terminals 200, the communication control device 300 may only distribute the margin for the wireless device, and the wireless device 100 may use a part of the interference margin distributed to the wireless device 100 as the total amount of the interference margin to be distributed to the subordinate terminals 200 (that is, the margin for the terminal). Alternatively, the wireless device 100 may notify the communication control device 300 of the number of the subordinate terminals 200 so that the communication control device 300 may use the number. The number of the terminals 200 may be the number of the terminals 200 that actually exist or the maximum number of terminals 200 that the wireless device 100 can accommodate. Determination of the margin for the terminal by the wireless device 100 can be performed by the method described so far.

(1.3.5. Method of Distributing Margin for Terminal in Wireless Device)

The wireless device 100 receives the margin for the terminal from the communication control device 300. The margin for the terminal received by the wireless device 100 from the communication control device 300 needs to be distributed to each of the subordinate terminals 200. Since the terminals 200 have mobility unlike the wireless device 100, it is very difficult to strictly perform margin distribution on the basis of position information of the terminals 200.

Therefore, in the present embodiment, a coverage of the wireless device 100 may be divided into one or more areas, and the wireless device 100 may distribute the margin in units of the divided area.

Figure 15:
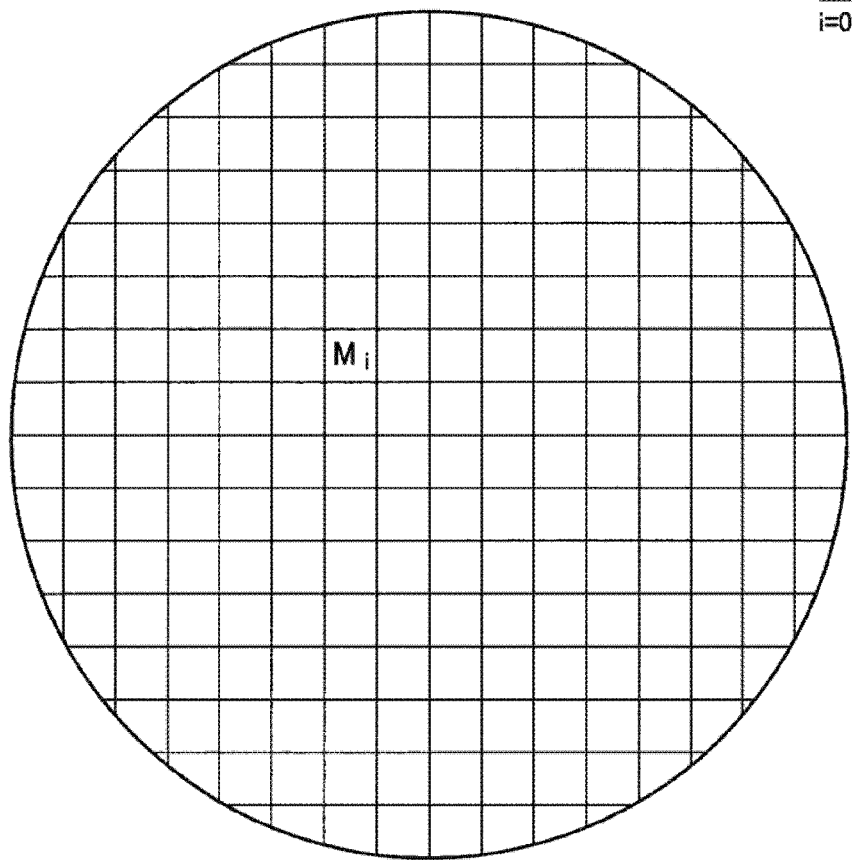
FIG. 15 is an explanatory diagram illustrating an example of coverage division and margin distribution of the wireless device.

FIG. 15 is an explanatory diagram illustrating an example of the coverage division and the margin distribution of the wireless device 100. In FIG. 15, the coverage of the wireless device 100 is divided into a grid shape, and the margin is distributed to each area.

In the above-described example, the coverage of the wireless device 100 is generated by being divided into the grid shape, but the present disclosure is not limited to this example. For example, a concept of a height direction may be introduced and the coverage of the wireless device 100 may be expressed in a cube shape instead of the grid shape, to generate the area.

The wireless device 100 may evenly distribute the margin throughout the coverage. The wireless device 100 may also distribute a larger margin to an area closer to the wireless system to be protected and a smaller margin to an area farther from the wireless system to be protected. Furthermore, the wireless device 100 may estimate an interference power that the terminal 200 may give from each area to the wireless system to be protected, and distribute a larger interference margin as the estimated interference power is larger.

Needless to say, the present disclosure is not limited to the above-described criterion, and the wireless device 100 may distribute the margin by any criterion as long as a restriction of protecting the wireless system to be protected or making the amount of interference less than the allowable amount of interference is satisfied.

As described above, the margin allocated in units of an area is applied to a terminal located in the area. Note that, when the coverage is divided, it is desirable that the size of the divided area is not large.

A transmission power applied to the terminal 200 may be a value obtained by limiting a calculation result of the uplink transmission power control performed by the wireless device 100 or the terminal 200 itself by the maximum allowable transmission power calculated on the basis of the applied margin. In a case where the terminal 200 performs the uplink transmission power control, the wireless device 100 notifies the terminal 200 of the margin. At this time, the terminal 200 may be notified of margin information of one or more areas in the coverage as a list. The terminal 200 sets a transmission power to which the margin is applied in accordance with the position of the terminal 200.

Although the present embodiment has been described by use of expressions such as a communication control device and a wireless system, implementation of the present disclosure is not limited to these.

For example, it is not necessary to limit the implementation of the present disclosure to a frequency band in which the frequency sharing is performed, and in this case, a network manager may have a function of the communication control device of the present embodiment. The network manager may be a centralized base band unit (BBU) having a network configuration called centralized RAN or a device including the centralized BBU. Furthermore, a wireless base station or an access point may have a function of the network manager of the present embodiment. In this case, a "terminal" may be applied instead of the wireless system shown in the present embodiment.

Furthermore, although, in general, an existing system that uses a target band is called the primary system and a secondary user is called the secondary system in the frequency sharing, the present disclosure may be implemented by use of other terms instead. For example, a macrocell in a heterogeneous network (HetNet) may be the primary system, and a small cell or a relay station may be the secondary system. Furthermore, the base station may be the primary system, and a relay UE or a vehicle UE that implements D2D or V2X existing within a coverage of the primary system may be the secondary system. The base station is not limited to a fixed type, but may be a portable type or a mobile type.

Furthermore, the term "frequency" used in the present embodiment may be replaced with another term. For example, a term an indicating frequency block such as "frequency channel", "resource block", or "component carrier" may be applied instead.

[1.4. Configuration Example]

Figure 16:
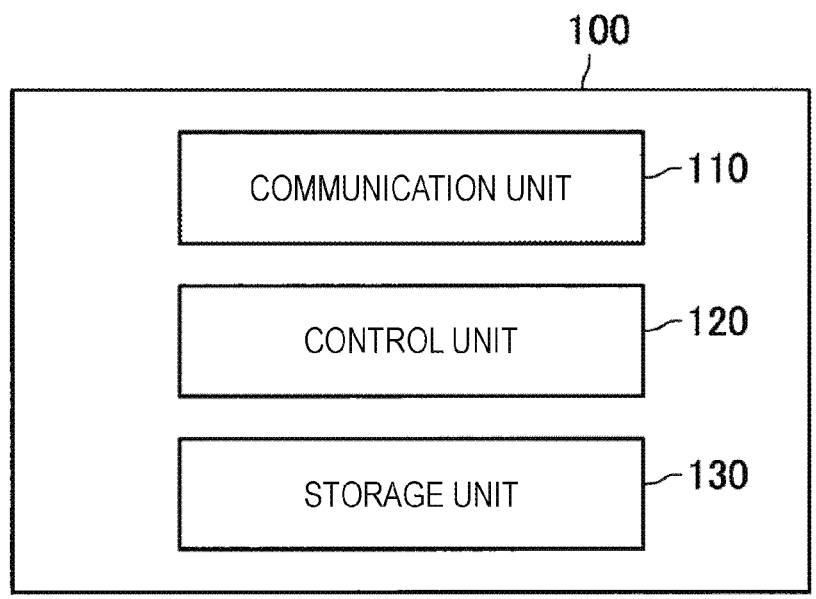
FIG. 16 is an explanatory diagram illustrating a functional configuration example of a wireless device 100 according to the embodiment of the present disclosure.

Next, a functional configuration example of the wireless device according to the embodiment of the present disclosure will be described. FIG. 16 is an explanatory diagram illustrating the functional configuration example of the wireless device 100 according to the embodiment of the present disclosure. Hereinafter, the functional configuration example of the wireless device 100 according to the embodiment of the present disclosure will be described with reference to FIG. 16.

As illustrated in FIG. 16, the wireless device 100 according to the embodiment of the present disclosure includes a communication unit 110, a control unit 120, and a storage unit 130.

The communication unit 110 executes communication with another device, for example, the communication control device 300 that manages the wireless device 100, or the terminal 200 that performs wireless communication with the wireless device 100 in the secondary system, under the control of the control unit 120. In the present embodiment, the communication unit 110 receives information for control from the communication control device 300, and transmits information for control to the terminal 200 that performs wireless communication with the wireless device 100 in the secondary system, for example.

The control unit 120 controls an operation of the wireless device 100. Specifically, the control unit 120 performs the above-described various calculations of the margin and processing of accommodating another device with the residual interference margin on the basis of information managed by the wireless device 100 and the information acquired by the communication unit 110. The control unit 120 may include, for example, a processor such as a central processing unit (CPU) and a storage device such as a read only memory (ROM) or a random access memory (RAM).

The storage unit 130 stores information, programs, or the like for the operation of the wireless device 100. The storage unit 130 may include various recording devices such as a hard disk drive (HDD), for example.

Figure 17:
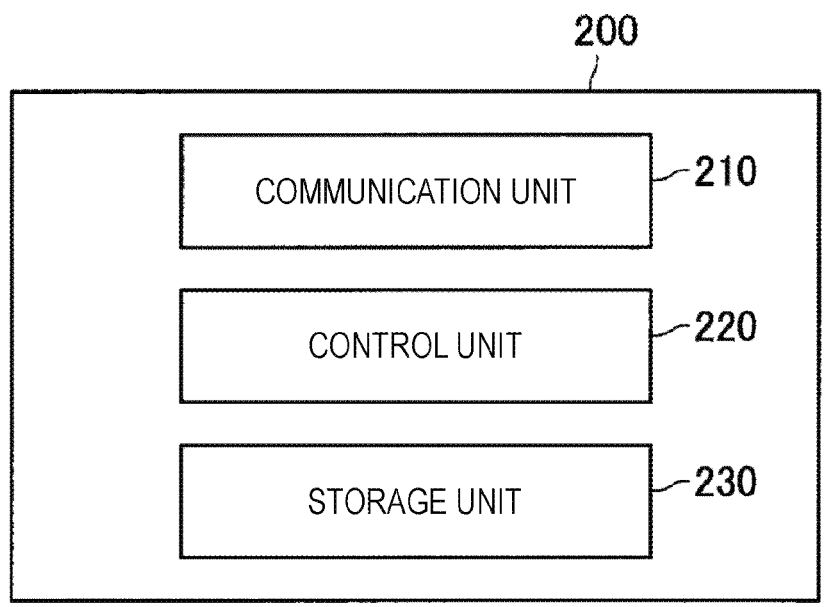
FIG. 17 is an explanatory diagram illustrating a functional configuration example of a terminal 200 according to the embodiment of the present disclosure.

Next, a functional configuration example of the terminal according to the embodiment of the present disclosure will be described. FIG. 17 is an explanatory diagram illustrating the functional configuration example of the terminal 200 according to the embodiment of the present disclosure. Hereinafter, the functional configuration example of the terminal 200 according to the embodiment of the present disclosure will be described with reference to FIG. 17.

As illustrated in FIG. 17, the terminal 200 according to the embodiment of the present disclosure includes a communication unit 210, a control unit 220, and a storage unit 230.

The communication unit 210 executes communication with another device, for example, the wireless device 100 that performs wireless communication with the terminal 200 in the secondary system, under the control of the control unit 220. In the present embodiment, the communication unit 210 receives the information for control from the terminal 200 that performs wireless communication with the terminal 200 in the secondary system, for example.

The control unit 220 controls an operation of the terminal 200. Specifically, the control unit 220 performs setting processing of a transmission power on the basis of information managed by the terminal 200 and the information acquired by the communication unit 210. The control unit 220 may include, for example, a processor such as a CPU and a storage device such as a ROM or a RAM.

The storage unit 230 stores information, programs, or the like for the operation of the terminal 200. The storage unit 130 may include various recording devices such as an HDD or various RAMS, for example.

Figure 18:
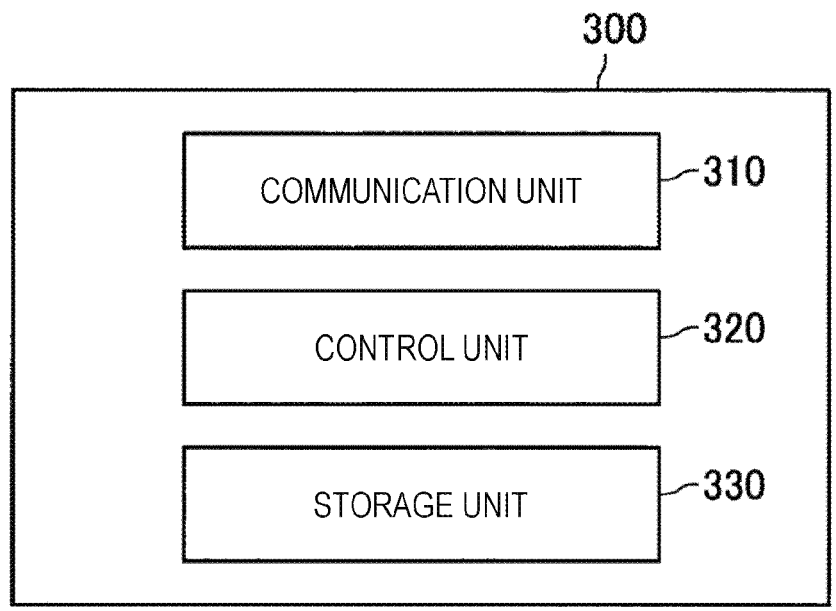
FIG. 18 is an explanatory diagram illustrating a functional configuration example of a communication control device 300 according to the embodiment of the present disclosure.

Next, a functional configuration example of the communication control device according to the embodiment of the present disclosure will be described. FIG. 18 is an explanatory diagram illustrating the functional configuration example of the communication control device 300 according to the embodiment of the present disclosure. Hereinafter, the functional configuration example of the communication control device 300 according to the embodiment of the present disclosure will be described with reference to FIG. 18.

As illustrated in FIG. 18, the communication control device 300 according to the embodiment of the present disclosure includes a communication unit 310, a control unit 320, and a storage unit 330.

The communication unit 310 executes communication with other devices under control of the control unit 320. In the present embodiment, the communication unit 310 transmits information for controlling the wireless device 100 managed by the communication control device 300, and transmits and receives, to and from another communication control device, information regarding a wireless device to be managed.

The control unit 320 controls operation of the communication control device 300. Specifically, the control unit 320 performs the above-described various calculations of a margin and processing of accommodating another device with a residual interference margin on the basis of information managed by the communication control device 300 and the information acquired by the communication unit 310. The control unit 320 may include, for example, a processor such as a CPU and a storage device such as a ROM or a RAM.

The storage unit 330 stores information, programs, or the like for the operation of the communication control device 300. The storage unit 330 stores, for example, the frequency management database described above. The frequency management database stored in the storage unit 330 is updated by the control unit 320. Note that the storage unit 330 may include various recording devices such as an HDD, for example. Note that the frequency management database described above may be stored in another device different from the communication control device 300. In this case, the communication control device 300 updates the frequency management database stored in the another device and refers to the frequency management database.

The configurations of the wireless device 100, the terminal 200, and the communication control device 300 described above are for explaining the configuration for executing the function of each device, and each device may have a configuration other than the configuration described above in order to execute the operation described so far.

For example, an acquisition unit in the wireless device 100 of the present disclosure may be the communication unit 110 or may be an interface between the communication unit 110 and the control unit 120. That is, the communication unit 110 acquires a distribution amount of an interference margin to a secondary system (second wireless system) that shares a part or the whole of a frequency allocated to a primary system (first wireless system), from the communication control device 300 that manages one or more of the secondary systems. Furthermore, the control unit 120 determines, from the interference margin, a distribution amount of the interference margin to a terminal that performs wireless communication with the wireless device 100 in the secondary system.

For example, an acquisition unit in the terminal 200 of the present disclosure may be the communication unit 210 or may be an interface between the communication unit 210 and the control unit 220. That is, the communication unit 210 acquires information regarding a secondary system (second wireless system) that shares a part or the whole of a frequency allocated to a primary system (first wireless system), from the wireless device 100 that performs wireless communication with the terminal 200 in the secondary system. Furthermore, the control unit 220 determines a transmission power for the wireless communication with the wireless device 100 in the secondary system, by use of the information acquired by the communication unit 210.

Furthermore, for example, the acquisition unit and the control unit according to the present disclosure may be implemented by one system-on-a-chip (SoC). In this case, for example, the control units 120 and 220 may have functions of the acquisition unit and the control unit according to the present disclosure.

The communication control device 300 may set a band use condition when causing the wireless device 100 to use a frequency of a shared band. As a result, for example, the wireless device 100 that uses the shared band can use a usable band that is a part of the above shared band even if the wireless device 100 cannot use the whole of the above shared band. Therefore, use efficiency of the above shared band can be improved.

—Usable Space

For example, the above band use condition includes a space in which the wireless device 100 can use the above shared band (hereinafter, "usable space").

For example, the above usable space is a space in which a reception power of a signal transmitted by the wireless device 100 using the above shared band may be equal to or higher than a predetermined power. In other words, the above usable space is any space other than a space in which the reception power of the signal transmitted by the wireless device 100 using the above shared band must be lower than the predetermined power.

As a result, for example, the wireless device 100 can use the above shared band in a limited space even if the above shared band cannot be used in the whole space. For example, the wireless device 100 may use the above shared band with a suppressed transmission power even if the above shared band cannot be used with the maximum transmission power. Therefore, use efficiency of the above shared band can be improved.

Note that the above usable space is not limited to a space in which the wireless device 100 can use the whole of the above shared band, but may be a space in which the wireless device 100 can use a part of the above shared band.

Furthermore, the above usable space may be an exclusive space of the wireless system for the above shared band (that is, a space in which a wireless device of another wireless system other than the wireless system cannot use a part or the whole of the above shared band).

A specific example of the usable space will be described. FIGS. 19 to 25 are explanatory diagrams for describing first to seventh examples of the usable space of the wireless system.

First Example

Figure 19:
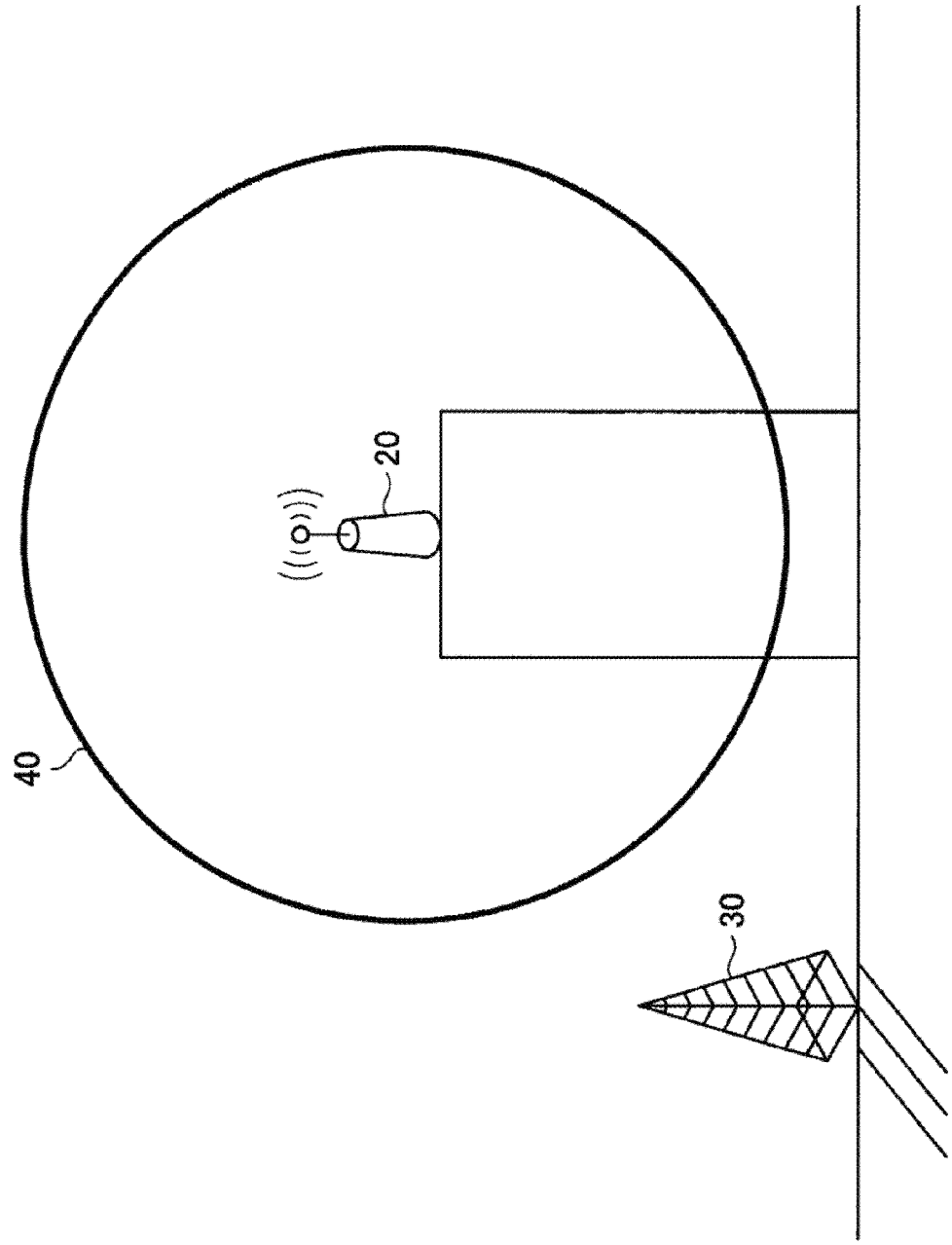
FIG. 19 is an explanatory diagram for describing an example of the usable space for the wireless system.

Referring to FIG. 19, a wireless device 20 of a wireless system and a wireless device 30 of another wireless system are illustrated. The wireless device 20 is a base station of the wireless system, and the wireless device 30 is a reception device. In this case, for example, when the wireless device 20 transmits a signal with the maximum transmission power, a level of interference with the wireless device 30 exceeds an allowable level of the another wireless system. Therefore, a transmission power candidate that makes the level of interference with the wireless device 30 equal to or lower than the above allowable level is selected, and a space corresponding to the transmission power candidate (for example, a space in which a reception power of a signal transmitted by the wireless device 20 with the transmission power candidate is equal to or higher than a predetermined power) is calculated as a usable space 40. Use of a shared band by the wireless device 20 is then permitted under the use condition including the usable space 40.

Note that, for example, even if the wireless device 20 transmits a signal with the maximum transmission power, in a case where the level of interference with the wireless device 30 is equal to or lower than the allowable level of the above another wireless system, a space corresponding to the above maximum transmission power is calculated as the usable space 40.

Second Example

Figure 20:
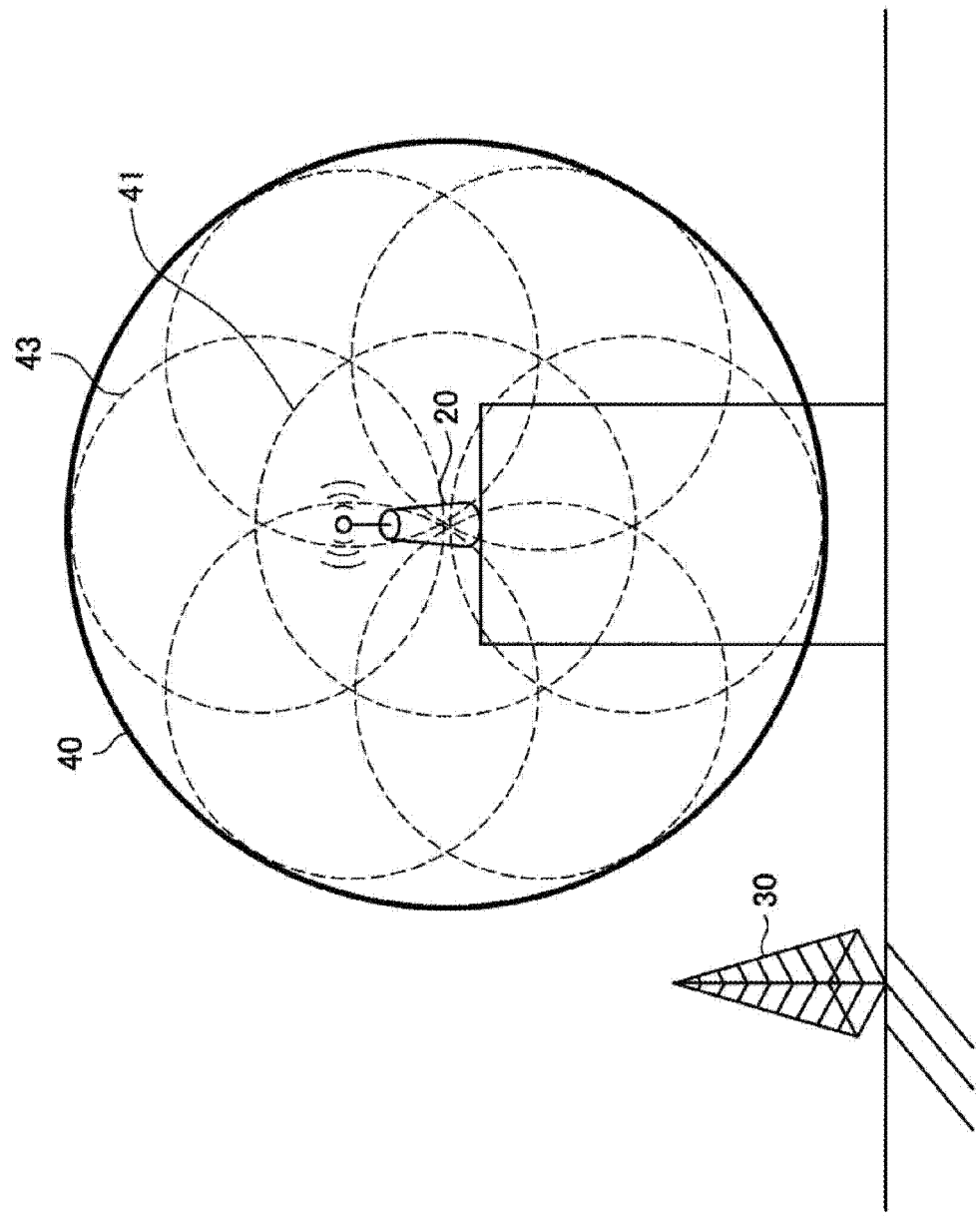
FIG. 20 is an explanatory diagram for describing an example of the usable space for the wireless system.

Referring to FIG. 20, similarly to FIG. 19, a wireless device 20 of a wireless system and a wireless device 30 of another wireless system are illustrated. In this example, in consideration of presence of another wireless device (for example, a terminal device) that performs wireless communication with the wireless device 20 (for example, a base station), a transmission power candidate (of the wireless device 20) that makes a level of interference with the wireless device 30 equal to or lower than the above allowable level is selected. That is, a transmission power candidate smaller than that in the example illustrated in FIG. 19 is selected. Then, for example, a usable space 40 including a space 41 in which a reception power of a signal transmitted by the wireless device 20 with the transmission power candidate is equal to or higher than a predetermined power, and a space 43 in which a signal transmitted by the above another wireless device is equal to or higher than the above predetermined power is calculated.

Third Example

Figure 21:
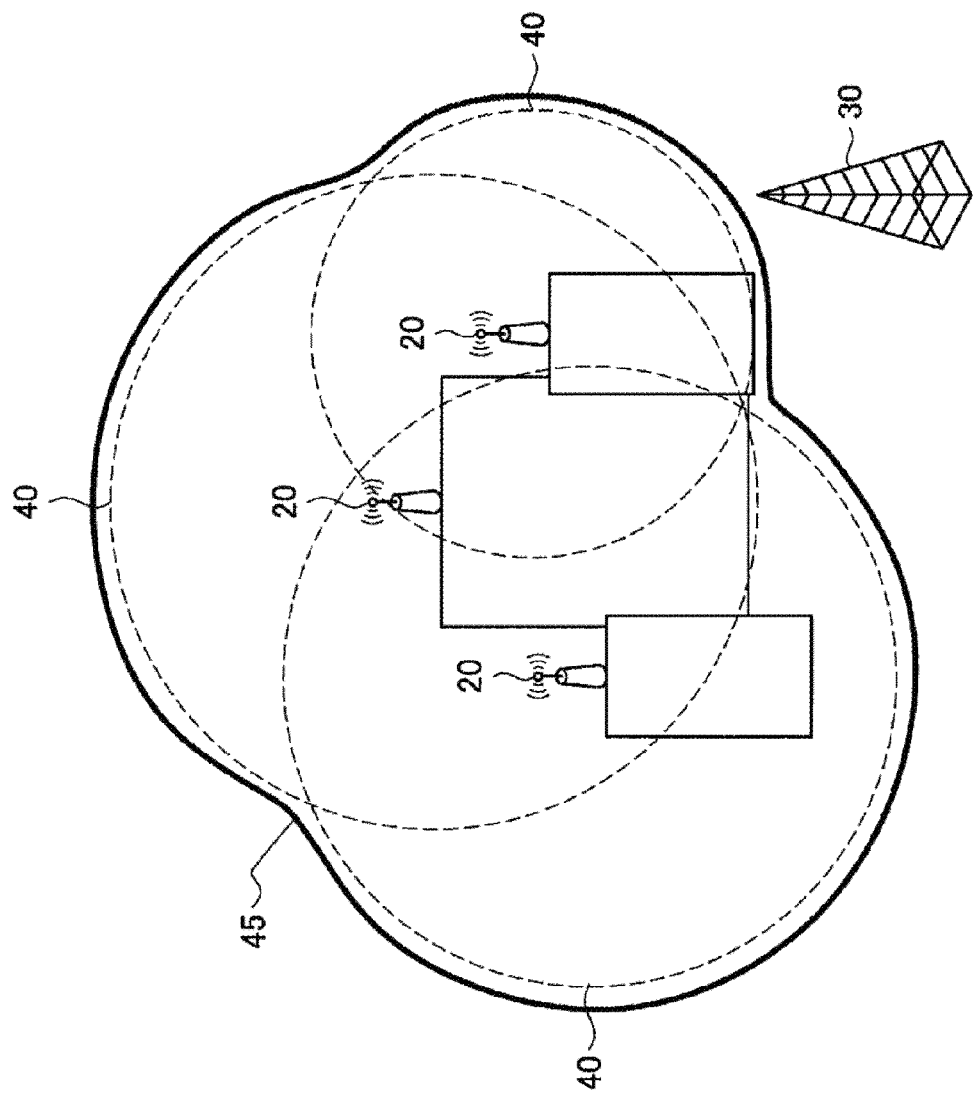
FIG. 21 is an explanatory diagram for describing an example of the usable space for the wireless system.

Referring to FIG. 21, three wireless devices 20 of a wireless system and a wireless device 30 of another wireless system are illustrated. In this example, a usable space 40 for each of three wireless devices 20 is calculated. Furthermore, a combined space of three usable spaces 40 is finally calculated as a usable space 45 for the above three wireless devices 20.

In the embodiment of the present disclosure, the communication control device 300 may calculate the usable space 40 for each wireless device 20, and may calculate the usable space 45 for the plurality of wireless devices 20 (that is, the combined space of the plurality of usable spaces 40).

Fourth Example

Figure 22:
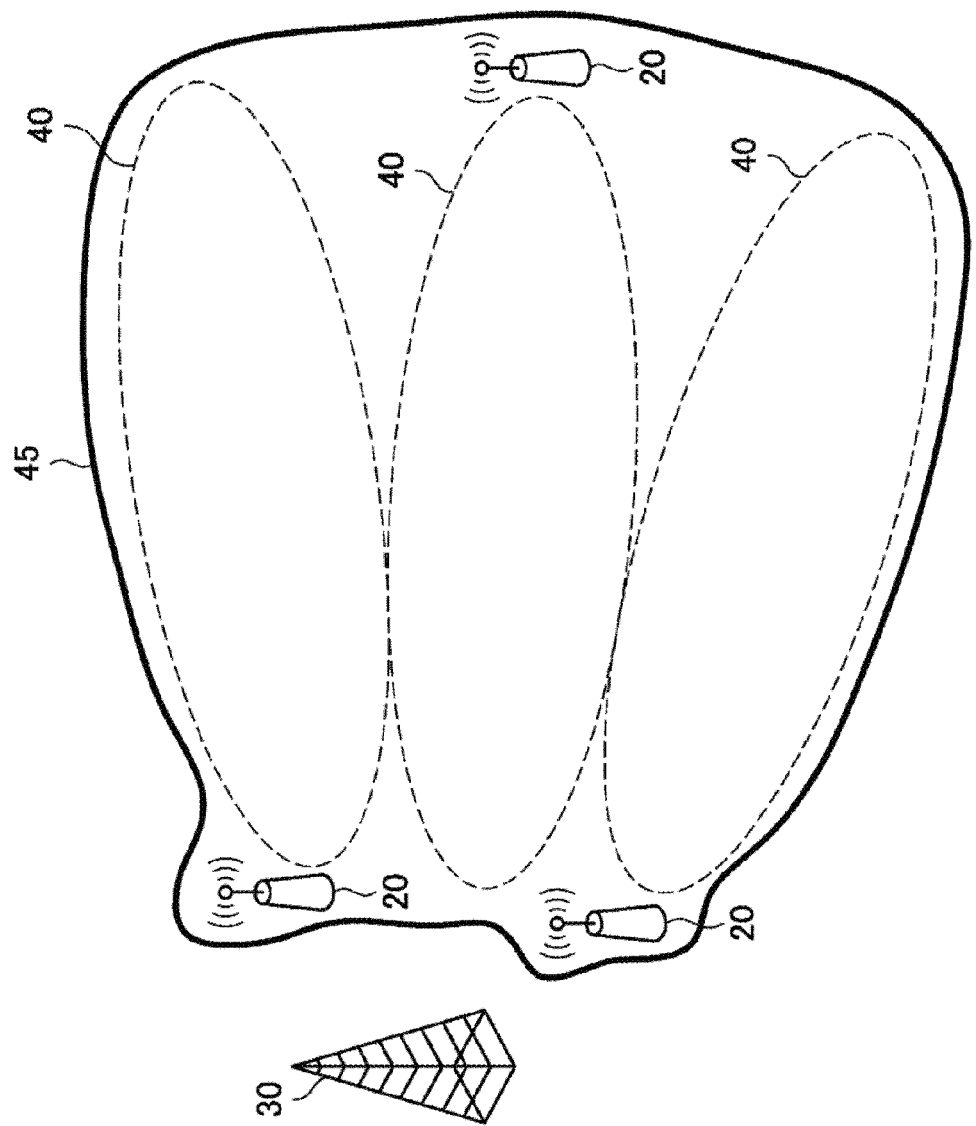
FIG. 22 is an explanatory diagram for describing an example of the usable space for the wireless system.

Referring to FIG. 22, three wireless devices 20 of a wireless system and a wireless device 30 of another wireless system are illustrated. In this example, the wireless devices 20 perform beamforming, and usable spaces 40 for the wireless devices 20 in a case where the wireless devices 20 perform beamforming are calculated. Furthermore, a combined space of three usable spaces 40 is calculated as a usable space 45 for the above three wireless devices 20.

Fifth Example

Figure 23:
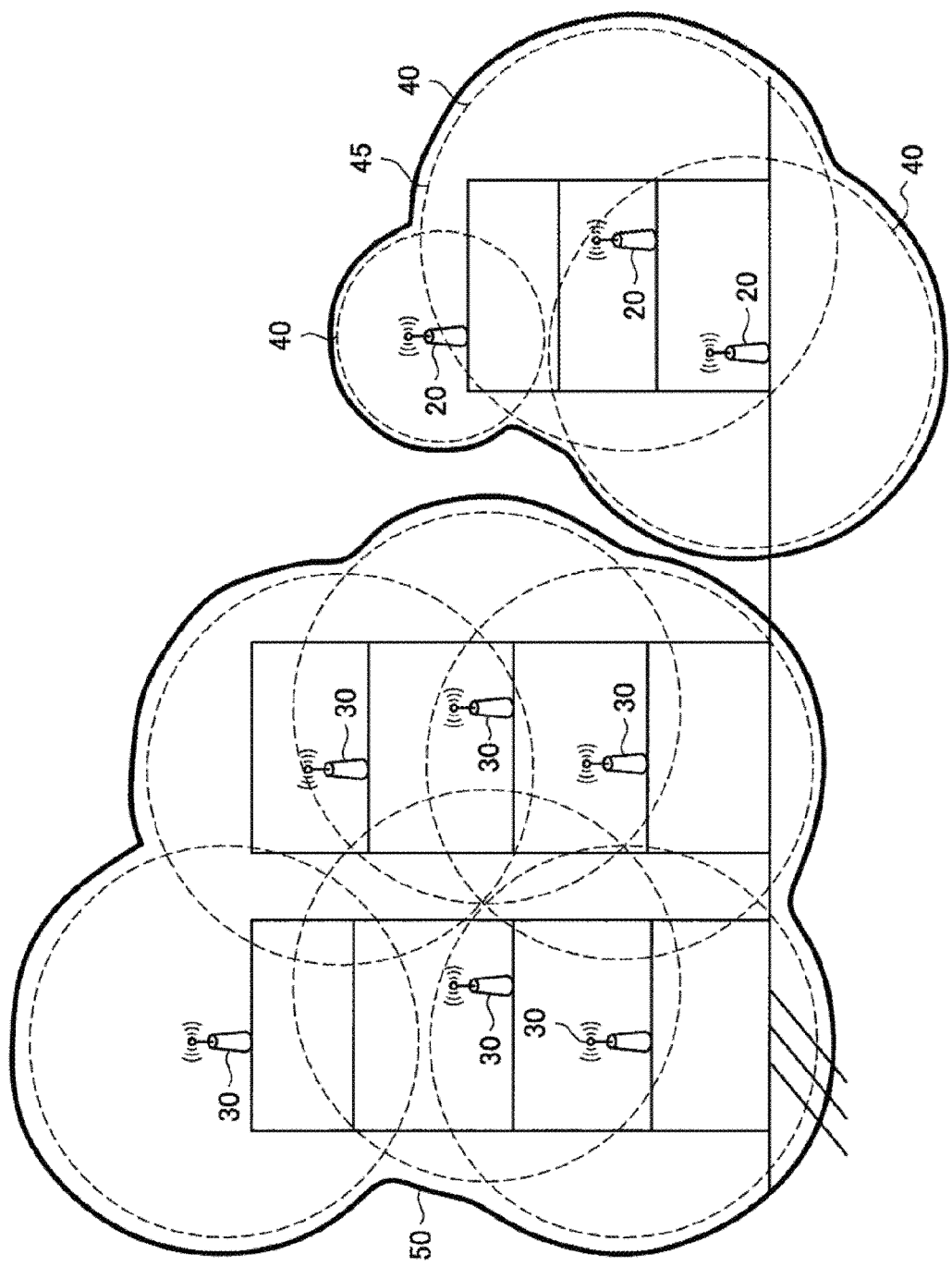
FIG. 23 is an explanatory diagram for describing an example of the usable space for the wireless system.

Referring to FIG. 23, a plurality of wireless devices 20 of a wireless system and a plurality of wireless devices 30 of another wireless system are illustrated. In this example, a space that does not overlap a space 50 in which the plurality of wireless devices 30 of the above another wireless system can use a shared band is calculated as a usable space 45 for the plurality of wireless devices 30. Note that a usable space 40 for each of the plurality of wireless devices 30 may be calculated.

Sixth Example

Figure 24:
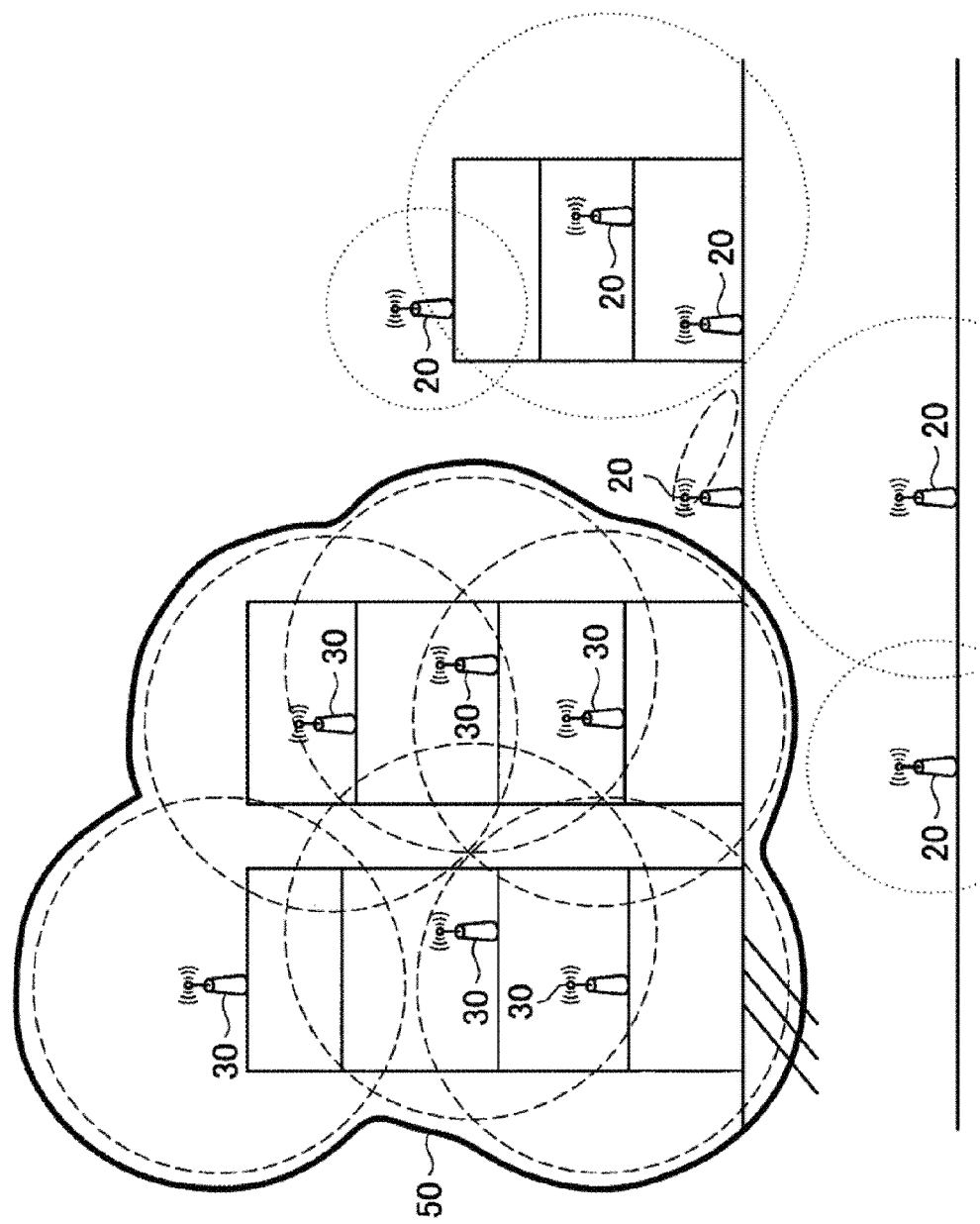
FIG. 24 is an explanatory diagram for describing an example of the usable space for the wireless system.

Referring to FIG. 24, a plurality of wireless devices 20 of a wireless system and a plurality of wireless devices 30 of another wireless system are illustrated. In this example, all spaces other than a space 50 in which the plurality of wireless devices 30 of the above another wireless system can use a shared band are calculated as usable spaces for the plurality of wireless devices 30.

Seventh Example

Figure 25:
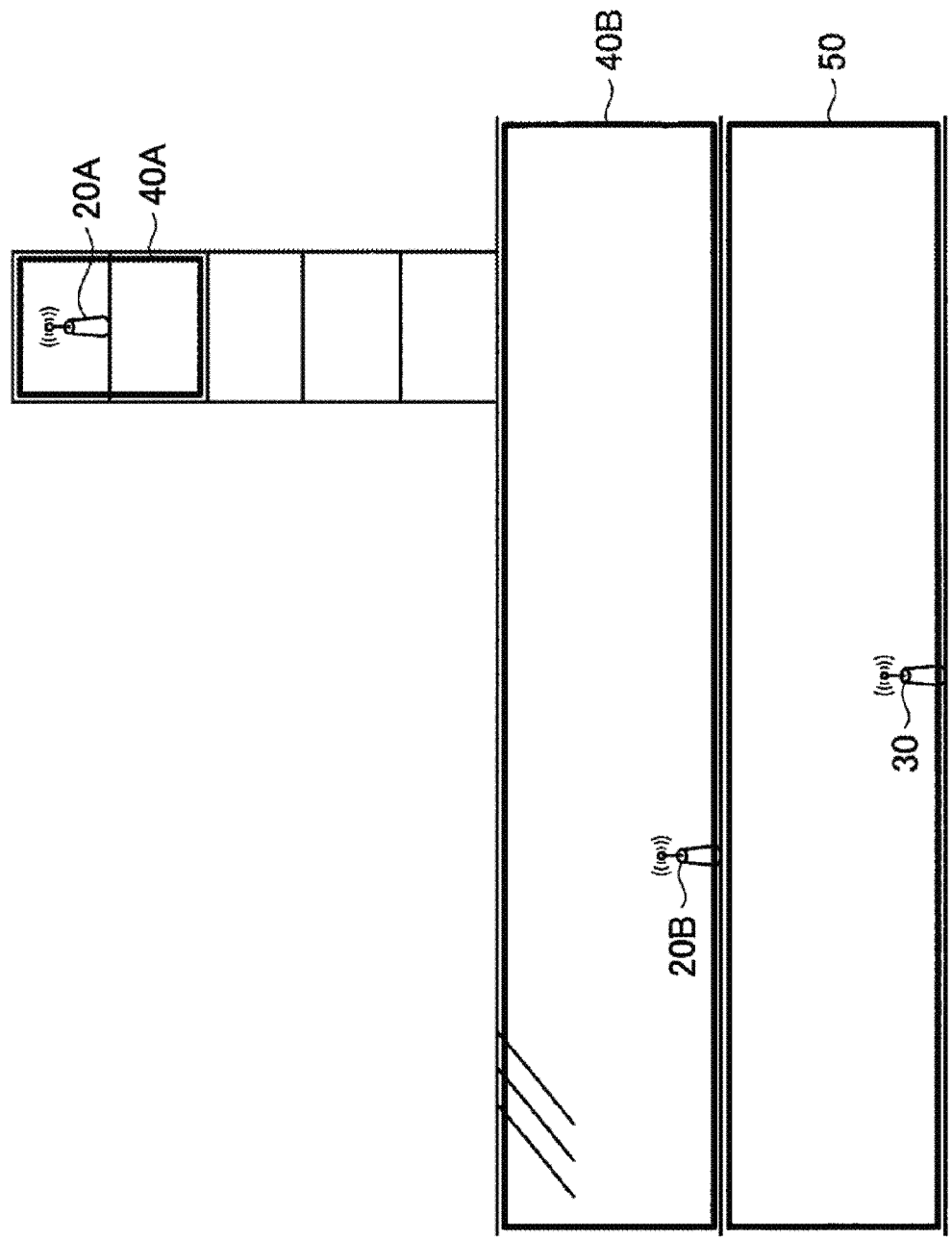
FIG. 25 is an explanatory diagram for describing an example of the usable space for the wireless system.

Referring to FIG. 25, two wireless devices 20 of a wireless system and a wireless device 30 of another wireless system are illustrated. In this example, a space 50 in which the wireless device 30 can use a shared band is a space on a second basement floor. In this case, for example, a space on a third floor and a fourth floor of a building is selected as a usable space 40A for a wireless device 20A, and a space on a first basement floor is selected as a usable space 40B for a wireless device 20B. As described above, a space on a floor can be selected as a usable space.

Note that the wireless devices 20 cannot radiate radio waves in a shape such as the usable spaces 40 described above (for example, the space on the third floor and the fourth floor of the building, or the space on the first basement floor). Therefore, the maximum transmission power of the wireless devices 20 may be calculated so that a leakage power to the outside of the usable spaces 40 is equal to or lower than a predetermined power (or lower than the predetermined power). Furthermore, the usable spaces 40 including a margin space outside the floors may be calculated in consideration of leakage of the radio waves outside the floors.

2. Summary

As described above, according to the embodiment of the present disclosure, it is possible to provide a communication control device capable of appropriately accommodating another device with an interference margin distributed to a communication device depending on the situation.

Each step in the processing executed by each device in the present specification does not necessarily need to be processed in time series in the order described as a sequence diagram or a flowchart. For example, each step in the processing executed by each device may be processed in an order different from the order described as the flowchart, or may be processed in parallel.

Furthermore, it is possible to create a computer program for causing hardware such as a CPU, a ROM, and a RAM built in each device to exhibit an equivalent function to the configuration of each device described above. In addition, a storage medium storing the computer program can also be provided. Moreover, configuring each functional block illustrated in a functional block diagram with hardware makes it possible to implement a series of processing with the hardware.

The preferred embodiment of the present disclosure has been described above in detail with reference to the accompanying drawings, but the technical scope of the present disclosure is not limited to such examples. It is obvious that those having ordinary knowledge in the technical field of the present disclosure can conceive various changes or modifications within the scope of the technical idea described in the claims, and of course, it is understood that these changes and modifications also belong to the technical scope of the present disclosure.

Furthermore, the effects described in the present specification are merely illustrative or exemplary, and are not restrictive. That is, the technology according to the present disclosure can exhibit other effects that are obvious to those skilled in the art from the description in the present specification, in addition to or instead of the above effects.

Note that the following configurations also belong to the technical scope of the present disclosure.

(1)

A wireless device including an acquisition unit that acquires a distribution amount of an interference margin to a second wireless system that shares a part or a whole of a frequency allocated to a first wireless system, from a device that manages one or more of the second wireless systems, and a control unit that determines, from the interference margin, a distribution amount of the interference margin to a terminal that performs wireless communication with the wireless device in the second wireless system.

(2)

The wireless device according to (1), in which the control unit notifies the terminal of information regarding the interference margin.

(3)

The wireless device according to (1), in which the control unit notifies the terminal of information regarding a transmission power of the terminal determined on the basis of the interference margin.

(4)

The wireless device according to any of (1) to (3), in which the control unit divides a coverage of the wireless device into a plurality of areas and determines the distribution amount of the interference margin to the terminal in units of the area.

(5)

A terminal including an acquisition unit that acquires information regarding a second wireless system that shares a part or a whole of a frequency allocated to a first wireless system, from a wireless device that performs wireless communication with the terminal in the second wireless system, and a control unit that determines a transmission power for the wireless communication with the wireless device in the second wireless system, by use of the information acquired by the acquisition unit.

(6)

The terminal according to (5), in which the acquisition unit acquires, as the information, information regarding an interference margin, and the control unit determines the transmission power by use of the information regarding the interference margin.

(7)

The terminal according to (5), in which the acquisition unit acquires, as the information, information regarding a transmission power determined on the basis of an interference margin, and the control unit determines the transmission power by use of the information regarding the transmission power.

(8)

The terminal according to any of (5) to (7), in which the acquisition unit divides a coverage of the wireless device into a plurality of areas, and acquires, as the information, a distribution amount of an interference margin set in units of the area, and the control unit determines the transmission power on the basis of the distribution amount of the interference margin in the units of the area.

(9)

A method including executing, by a processor, acquiring a distribution amount of an interference margin to a second wireless system that shares a part or a whole of a frequency allocated to a first wireless system, from a device that manages one or more of the second wireless systems, and determining, from the interference margin, a distribution amount of the interference margin to a terminal that performs wireless communication with the processor in the second wireless system.

(10)

A method including executing, by a processor, acquiring information regarding a second wireless system that shares a part or a whole of a frequency allocated to a first wireless system, from a wireless device that performs wireless communication with the processor in the second wireless system, and determining a transmission power for the wireless communication with the wireless device in the second wireless system, by use of the acquired information.

(11)

A computer program that causes a computer to execute acquiring a distribution amount of an interference margin to a second wireless system that shares a part or a whole of a frequency allocated to a first wireless system, from a device that manages one or more of the second wireless systems, and determining, from the interference margin, a distribution amount of the interference margin to a terminal that performs wireless communication with the computer in the second wireless system.

(12)

A computer program that causes a computer to execute acquiring information regarding a second wireless system that shares a part or a whole of a frequency allocated to a first wireless system, from a wireless device that performs wireless communication with the computer in the second wireless system, and determining a transmission power for the wireless communication with the wireless device in the second wireless system, by use of the acquired information.

REFERENCE SIGNS LIST

100$a$ Wireless device
100$b$ Wireless device
100$c$ Wireless device
100$d$ Wireless device
100$e$ Wireless device
200$a$ Terminal
200$b$ Terminal
200$c$ Terminal
200$d$ Terminal
300$a$ Communication control device
300$b$ Communication control device

The invention claimed is:

1. A wireless device configured operate in a second wireless system and that uses a frequency allocated to a first wireless system, the wireless device comprising:

a transceiver; and control circuitry configured to:

acquire a distribution amount of an interference margin to the second wireless system that shares a part or a whole of the frequency allocated to the first wireless system, from a device that manages one or more of second wireless systems, the one or more of second wireless systems including the second wireless system; and determine, from the interference margin, a distribution amount of the interference margin to a terminal that performs wireless communication with the wireless device in the second wireless system, wherein the interference margin includes an interference margin to the wireless device and an interference margin to the terminal, and wherein the control circuitry divides a coverage of the wireless device into a plurality of areas and determines, from the amount of the interference margin to the terminal, the distribution amount of an interference margin to each of the areas.

2. The wireless device according to claim 1, wherein the control circuitry notifies the terminal of information regarding the interference margin.

3. The wireless device according to claim 1, wherein the control circuitry notifies the terminal of information regarding a transmission power of the terminal determined on a basis of the interference margin.

4. A method executed by a processor in a wireless device configured operate in a second wireless system and that uses a frequency allocated to a first wireless system the method comprising:

acquiring a distribution amount of an interference margin to the second wireless system that shares a part or a whole of the frequency allocated to the first wireless system, from a device that manages one or more of second wireless systems, the one or more of second wireless systems including the second wireless system; and determining, from the interference margin, a distribution amount of the interference margin to a terminal that performs wireless communication with the processor in the second wireless system, wherein the interference margin includes an interference margin to the wireless device and an interference margin to the terminal, wherein the method further comprises dividing a coverage of the wireless device into a plurality of areas and determines, from the amount of the interference margin to the terminal, the distribution amount of an interference margin to each of the areas.

5. A non-transitory computer program product that includes instructions that causes a computer, in a wireless device configured operate in a second wireless system and that uses a frequency allocated to a first wireless system, to execute a method comprising:

acquiring a distribution amount of an interference margin to the second wireless system that shares a part or a whole of the frequency allocated to the first wireless system, from a device that manages one or more of second wireless systems, the one or more of second wireless systems including the second wireless system; and determining, from the interference margin, a distribution amount of the interference margin to a terminal that performs wireless communication with the computer in the second wireless system, wherein the interference margin includes an interference margin to the wireless device and an interference margin to the terminal, wherein the method further comprises dividing a coverage of the wireless device into a plurality of areas and determines, from the amount of the interference margin to the terminal, the distribution amount of an interference margin to each of the areas.

6. The wireless device according to claim 1, wherein the control circuitry is further configured to:

determine, for each of a plurality of terminals that perform wireless communication with the wireless device in the second wireless system, whether or not a respective terminal is within a predetermined distance of the wireless device, determine, from the interference margin, a terminal-specific distribution amount of the interference margin only for those of the plurality of terminals that are determined to be within the predetermined distance; and notify, to those of the plurality of terminals that are determined to be within the predetermined distance, respective information about the terminal-specific distribution amount of the interference margin.

7. The method according to claim 4, further comprising:

determining, for each of a plurality of terminals that perform wireless communication with the wireless device in the second wireless system, whether or not a respective terminal is within a predetermined distance of the wireless device, determining, from the interference margin, a terminal-specific distribution amount of the interference margin only for those of the plurality of terminals that are determined to be within the predetermined distance; and notifying, to those of the plurality of terminals that are determined to be within the predetermined distance, respective information about the terminal-specific distribution amount of the interference margin.

8. The non-transitory computer program product according to claim 5, wherein the method further comprises:

determining, for each of a plurality of terminals that perform wireless communication with the wireless device in the second wireless system, whether or not a respective terminal is within a predetermined distance of the wireless device, determining, from the interference margin, a terminal-specific distribution amount of the interference margin only for those of the plurality of terminals that are determined to be within the predetermined distance; and notifying, to those of the plurality of terminals that are determined to be within the predetermined distance, respective information about the terminal-specific distribution amount of the interference margin.

* * * * *